United States Patent
Sakai

(12) 
(10) Patent No.: US 6,169,152 B1
(45) Date of Patent: *Jan. 2, 2001

(54) OLEFIN POLYMERIZATION CATALYST COMPRISING TRANSITION METAL COMPOUND CONTAINING A CYCLIC LIGAND HAVING AT LEAST TWO NITROGEN ATOMS IN ITS MAIN CHAIN SKELETON

(75) Inventor: Tatsuya Sakai, Tokyo (JP)

(73) Assignee: JSR Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/887,267

(22) Filed: Jul. 2, 1997

(30) Foreign Application Priority Data

Jul. 5, 1996 (JP) .................................................. 8-194157

(51) Int. Cl.$^7$ .............................. C08F 4/52; C08F 210/14
(52) U.S. Cl. .......................... 526/161; 526/169; 526/172; 526/281; 526/308; 526/309; 526/319; 526/331; 526/348; 502/117
(58) Field of Search ................................ 526/281, 308, 526/309, 319, 331, 348, 161, 169, 172; 502/117

(56) References Cited

U.S. PATENT DOCUMENTS

| | | | |
|---|---|---|---|
| 3,670,011 | * 6/1972 | Moody et al. | 260/483 |
| 3,723,399 | * 3/1973 | Amiard et al. | 260/80.73 |
| 4,028,482 | * 6/1977 | Ueshima et al. | 526/271 |
| 4,080,491 | * 3/1978 | Kobayashi et al. | 526/137 |
| 4,699,963 | * 10/1987 | Klosiewicz | 526/142 |
| 4,857,614 | * 8/1989 | Kaschig et al. | 526/172 |
| 5,039,766 | 8/1991 | Sasaki et al. . | |
| 5,134,104 | 7/1992 | Sasaki et al. . | |
| 5,164,469 | * 11/1992 | Goto et al. | 526/281 |
| 5,286,439 | * 2/1994 | Shinohara | 264/272.15 |
| 5,658,998 | * 8/1997 | Minami et al. | 526/281 |
| 5,693,728 | * 12/1997 | Okamoto et al. | 526/115 |
| 5,705,503 | * 1/1998 | Goodall et al. | 526/281 |
| 5,733,991 | * 3/1998 | Rohrmann et al. | 526/160 |
| 5,753,721 | * 5/1998 | Hafner et al. | 522/53 |
| 5,808,122 | * 9/1998 | Herrmann et al. | 556/58 |
| 5,837,787 | * 11/1998 | Harrington | 526/160 |
| 5,869,586 | * 2/1999 | Riedel et al. | 526/170 |
| 5,986,027 | * 11/1999 | Lippert et al. | 526/126 |

FOREIGN PATENT DOCUMENTS

| | | |
|---|---|---|
| 0 509 233 | 10/1992 | (EP) . |
| 0 537 609 | 4/1993 | (EP) . |
| WO 95/35164 | 12/1995 | (WO) . |
| WO 96/23010 | 8/1996 | (WO) . |

OTHER PUBLICATIONS

Patent Abstracts of Japan, vol. 95, No. 11, Dec. 26, 1995, JP 07–196779, Aug. 1, 1995.

Patent Abstracts of Japan, vol. 95, No. 11, Dec. 26, 1995, JP 07–196736, Aug. 1, 1995.

Stefan Breunig,et al., Die Makromolekulare Chemie, Macromolecular Chemistry and Physics, vol. 193, No. 11, pp. 2915–2927, Nov. 1, 1992, "Transition–Metal–Catalyzed Vinyl Addition Polymerization of Norbornene Derivatives with Ester Groups".

Luca Giannini, et al., "Migratory Aptitude of the Zr–C Functionalities Bonded to a Macrocyclic Structure: Thermally—and Solvent–Assisted Intra—and Intermolecular Migrations in Dialkyl (dibenzotetramethyltetraazaannulene)zirconium(IV)", Journal of the American Chemical Society., vol. 117, No. 21, 1995, pp. 5801–5811.

Erik B. Tjaden, et al., "Synthesis, Structures, and Reactivity of $(R_6$–acen$)ZrR^1{}_2$ and $(R_6$_acen$)Zr(R^1)^+$ Complexes (R=H, F;$R^1$=CH$_2$CMe$_3$, CH$_2$Ph)", Organometallics, vol. 14, No. 1, 1995, pp. 372–386.

Erik B. Tjaden, et al., "Design of Selective Single Site Olefin Polymerization Catalysts", Worldwide Metallocene Conference MetCon '94 May 25–27, 1994 Houston, TX USA, pp. 2–6.

* cited by examiner

Primary Examiner—David W. Wu
Assistant Examiner—R. Rabago
(74) Attorney, Agent, or Firm—Oblon, Spivak, McClelland, Maier & Neustadt, P.C.

(57) ABSTRACT

An olefin-polymerizing catalyst which comprises (A) a transition metal compound having at least one cyclic amide ligand and (B) an organoaluminum compound and/or an aluminoxane compound with or without (C) an ionic compound, the catalyst component of which is simple to synthesize, and which can polymerize an olefin at a lower temperature at a lower pressure than conventional catalysts, and particularly is high in copolymerizability of α-olefins, and is particularly effective in producing ethylene/polar group-containing cyclic olefin copolymers.

10 Claims, 1 Drawing Sheet

OLEFIN POLYMERIZATION CATALYST COMPRISING TRANSITION METAL COMPOUND CONTAINING A CYCLIC LIGAND HAVING AT LEAST TWO NITROGEN ATOMS IN ITS MAIN CHAIN SKELETON

BACKGROUND OF THE INVENTION

This invention relates to an olefin-polymerizing catalyst which comprises a transition metal compound and an organoaluminum compound, or a transition metal compound, an organoaluminum compound and an ionic compound, and to a process for producing an olefin polymer using the above olefin-polymerizing catalyst.

Polyolefins, representatives of which are polyethylene and polypropylene, and α-olefin copolymers are excellent in heat resistance, aging resistance, chemical resistance and the like, and have been put into practice as general purpose resins in a broad industrial field including automobile parts.

As a process for producing the above-mentioned polyolefin, there has been known a process in which a titanium-based catalyst consisting of a titanium compound and an organoaluminum compound, a representative of which is, for example, a Ziegler-Natta catalyst; or a vanadium-based catalyst consisting of a vanadium compound and an organoaluminum compound is used. However, the process for producing a polymer with the above-mentioned titanium-based catalyst can generally produce only a polymer having a low molecular weight and a broad molecular weight distribution, and said polymer cannot be said to be satisfactory in respect of activity. In addition, the copolymer obtained using the above-mentioned titanium-based catalyst is generally inferior in random copolymerizability, so that the composition distribution of the copolymer is broad and the mechanical property cannot be said to be sufficient. Moreover, in the case of the above-mentioned vanadium-based catalyst, the random copolymerizability is enhanced, the composition distribution becomes narrow and the mechanical property is improved to some extent, but this improvement cannot still be said to be sufficient.

As a substitute for the above-mentioned prior art catalyst, there has been proposed a catalyst consisting of a transition metal compound and an aluminoxane, and, for example, JP-B 4(1992)-12,283 describes a process for polymerizing an olefin in the presence of a catalyst consisting of a transition metal compound represented by the formula:

$$(Cp)_2MR^1X$$

wherein Cp is a cyclopentadienyl group, $R^1$ is an alkyl group having 1 to 6 carbon atoms or a halogen atom, M is zirconium or titanium and X is a halogen atom, and an aluminoxane represented by the formula:

$$(R^2)_2AlO[-Al(R^2)-O-]_nAl(R^2)_2 \text{ or } [-Al(R^2)O-]_{n+2}$$

wherein n is an integer of 4 to 20, $R^2$ is a methyl group or an ethyl group.

Furthermore, JP-B 5(1993)-80,493 describes a process for producing a copolymer having a molecular weight distribution ($M_w/M_n$) of 1.97 to 2.15 by copolymerizing ethylene with propylene or ethylene with an α-olefin having 3 to 10 carbon atoms and a non-conjugated polyene having 5 to 20 carbon atoms in the presence of a catalyst consisting of an aluminoxane and a zirconium hydride compound having as a ligand a group having a conjugated π-electron.

In addition to these catalysts which are generally called metallocene catalysts, it is known that metallocene compounds cross-linked with silicon or the like (JP-A 60(1985)-35,007 and JP-A 3(1991)-12,406), geometric constraint type CGCT complex compounds (JP-A 3(1991)-163,088) and the like copolymerize ethylene with an α-olefin.

Besides these metallocene catalysts, a catalyst consisting of an aluminoxane and a transition metal compound having a nitrogen-containing ligand has been proposed. For example, JP-A 2(1990)-277,412 discloses a process for copolymerizing ethylene with an α-olefin in the presence of a catalyst consisting of a transition metal compound represented by the formula:

$$(R^1R^2N)_{4-(m+n)}TiX_mY_n$$

wherein $R^1$ and $R^2$ represent saturated hydrocarbon groups having 8 to 30 carbon atoms, X represents a halogen, Y represents an alkoxy group, m represents $1 \leq m \leq 3$, and n represents a numeral of $0 \leq n \leq 2$, and an aluminoxane represented by the formula:

$$(R^3)_2AlO[-Al(R^3)O-]_nAl(R^3)_2 \text{ or } [-Al(R^3)O-]_{n+2}$$

wherein n is an integer of 4 to 20 and $R^3$ is a methyl group or an ethyl group. Also, R. F. Jordan, et al. have synthesized a complex consisting of a center metal of Group 4 and a ligand having porphyrin-ring structure as its main chain skelton and having 4 N atoms therein (Organometallics, 14, 371, 1995) and introduced an example of polymerization of ethylene.

Besides the above, in WO96-23010, there is proposed a catalyst consisting of a diimine ligand complex having Pd or Ni as the center metal and an organoaluminum compound such as an aluminoxane or the like. This catalyst system is called a Brookhart type diimine catalyst and enables the random copolymerization of ethylene with an acyclic olefin having a polar group, a representative of which is an ester group, by addition polymerization which random copolymerization has been impossible with the above-mentioned three catalyst systems. In addition, Risse et al. have obtained a homo-addition polymer of a polycyclic olefin having a polar group, representatives of which are an ester group and a carboxyl group, with a combination of a Pd complex with a cationizing agent (Macromol. Chem., 193, 2915, 1992).

However, in each of the catalysts and polymerization methods mentioned above, there are several problems.

First of all, in the case of the transition metal compounds, representatives of which are metallocene catalysts, there is such a problem that the synthesis thereof is very complicated and is technically difficult. In the synthesis of a metallocene type ligand, its synthesis route has so many stages as 2 to 5 stages, and hence, there is a problem in an aspect of production efficiency. A mono-Cp type metallocene catalyst and a non-cross-linked di-Cp type metallocene catalyst, the synthesis of which is relatively simple, have a low activity against an α-olefin and the resulting copolymer of ethylene with an α-olefin has an α-olefin content as low as about 5% by weight.

In addition thereto, there is such a problem that polymerization activity and high copolymerizability are not compatible with each other. An ethylene-cross-linked bisindenyl complex, which is a representative metallocene catalyst, has a high polymerization activity, but has a low α-olefin copolymerizability, and an α-olefin content of about 50% by wight is the upper limit. In the case of the nitrogen-containing ligand disclosed in JP-A 2(1990)-77,412 referred to above, the synthesis of a catalyst is simple and the polymerization activity is relatively high, but a high temperature and a high pressure are required as the reaction conditions therefor and severe polymerization conditions become necessary. This catalyst is also low in copolymerizability. Moreover, the Jordan et al. catalyst is low in copolymerizability of ethylene and a higher α-olefin.

Furthermore, the Brookhart type catalyst is a catalyst for copolymerizing ethylene with a polar olefin which has never been seen; however, there is such a problem that the polar olefin which can be used is limited, and methyl methacrylate and alicyclic polar olefins are not polymerized. Moreover, in the case of the Risse et al. catalyst, there is no example of copolymerization of ethylene with an alicyclic polar olefin.

SUMMARY OF THE INVENTION

This invention has been made under the above-mentioned circumstances and an object of this invention is to provide an olefin-polymerizing catalyst whose catalyst components are simply synthesized, which catalyst has a high copolymerizability of an α-olefin as compared with a conventional olefin catalyst and has a copolymerizability with a polar olefin, another object of this invention is to provide a process for producing an olefin polymer or copolymer using said catalyst, and still another object is to provide an olefin polymer or copolymer obtained by the process.

Other objects and advantages of this invention will become apparent from the following description.

According to this invention, there is provided an olefin-polymerizing catalyst which comprises (A) a transition metal compound consisting of a center transition metal and a cyclic ligand having in its main chain skeleton at least two N atoms bonded to one another through a carbon skeleton which is a saturated bond, at least one of which N atoms bonds to the center transition metal, and at least one member selected from the group consisting of the following compounds (B) and (C):

(B) at least one compound selected from the group consisting of an organoaluminum compound represented by the general formula (1) and an aluminoxane compound:

$$R_a AlZ_{3-a} \quad (1)$$

wherein R represents a hydrocarbon group having 1 to 20 carbon atoms, Z represents a hydrogen atom, an alkoxy group or a halogen atom and $0 < a \leq 3$; and (C) an ionic compound.

According to this invention, there is further provided a process for producing an olefin polymer or copolymer using the above-mentioned catalyst.

According to this invention, there is still further provided a polymer or copolymer obtained by the above-mentioned production process.

DETAILED DESCRIPTION OF THE INVENTION

Figure 1:
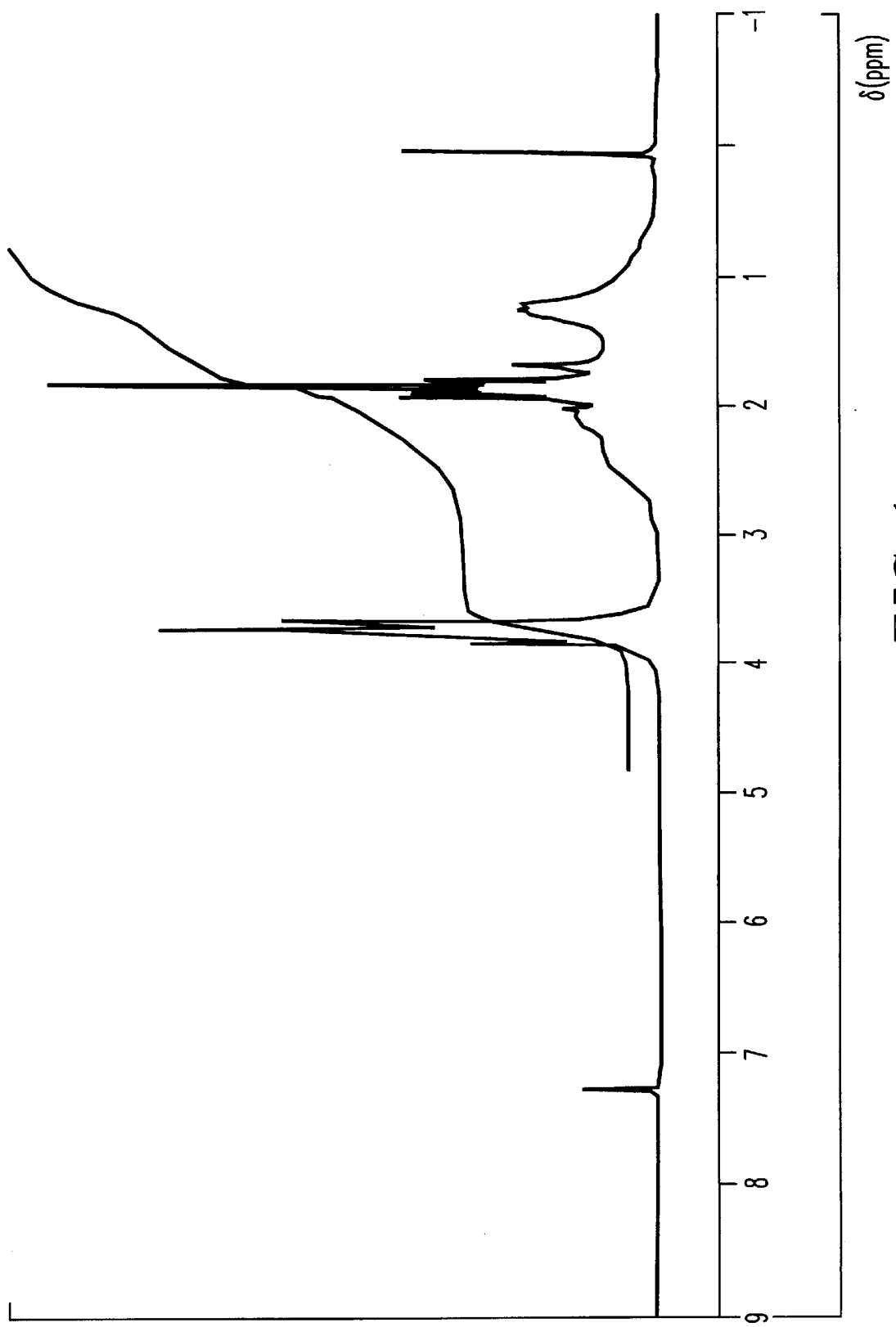
FIG. 1 is a $^1$H-NMR flow chart of ethylene/8-methyl-8-carboxymethyltetracyclo[4.4.0.1$^{2,5}$.1$^{7,10}$]-3-dodecene copolymer obtained in Example 27 which appears hereinafter.

The olefin-polymerizing catalyst of this invention and a process for polymerizing an olefin using the above catalyst are explained in detail below.

The transition metal compound (A) consists of a center transition metal and a cyclic ligand having in its main chain skeleton at least two N atoms bonded to one another through a carbon skeleton composed of saturated carbons, at least one of which N atoms bonds to the center transition metal (the above cyclic ligand is in some cases hereinafter referred to as the cyclic amide ligand).

A plurality of the above cyclic ligands may be present per the center metal and may contain in the main chain skeleton at least one other atom than the carbon and nitrogen atoms, such as silicon, oxygen, sulfur, boron, phosphor or the like. The bond between the center transition metal and the nitrogen atom in the transition metal compound (A) may be a covalent bond or a coordinate bond. When at least two cyclic amide ligands are present in the transition metal compound (A), the ligands may be the same as or different from one another.

The center transition metal in the transition metal compound (A) is a transition metal of Groups 3 to 10 or the lanthanum series (in other words, the lanthanoid), preferably a metal of Groups 3 to 5, or lanthanum series of the Periodic Table. As the said center transition metal, preferable are titanium, zirconium, hafnium, vanadium, tantalum, nickel, palladium, cobalt, ruthenium, rhodium, the lanthanum series metals and the like, and more preferable are titanium, zirconium and hafnium.

The transition metal compound (A) can have at least one other ligand than the above cyclic amide ligand. As such other ligands, there can be mentioned hydrogen atom, hydrocarbon groups having 1 to 20 carbon atoms, halogen atoms, alkoxy groups, carboxyl group, ester groups, halogenated hydrocarbon groups, alkylsilyl groups and the like. When two or more said other ligands are present in the transition metal compound (A), the said other ligands may be the same as or different from one another.

The transition metal compound (A) is preferably a transition metal complex which has a ligand in which 2, 3 or 4 nitrogen atoms which can participate in bonding to the center transition metal are present in its main chain skeleton and which are all bonded to one another to form one ring through a carbon skeleton which is a saturated bond. The cyclic ligand in said preferable transition metal compound (A) (or the cyclic amide ligand) has generally the main chain skeleton represented by the following general formula:

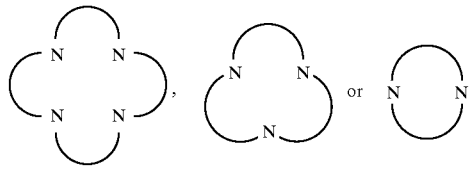

wherein the curve connecting the nitrogen atoms to one another means a saturated chain bond.

In the just above general formula, the bond connecting the nitrogen atoms to one another is a saturated bond. The main chain skeleton may contain other atoms than carbon atom (for example, B, Si, N, P, O, S and the like) and can have, besides hydrogen atom(s) at least one other substituent selected from the group consisting of halogen atoms, carboxyl group, hydrocarbon groups having 1 to 20 carbon atoms, alkoxy groups having 1 to 20 carbon atoms, ester groups having 2 to 20 carbon atoms, halogenated hydrocarbon groups having 1 to 20 carbon atoms, alkylsilyl groups having 1 to 20 carbon atoms and the like.

In the above-mentioned preferable transition metal compound (A), at least one nitrogen atom of the 2, 3 or 4 nitrogen atoms contained in the main chain skeleton of the cyclic amide ligand is bonded to the center transition metal. The bond can be a σ-bond or a coordination bond. The nitrogen atoms which are not σ-bonded to the center metal are bonded to, besides hydrogen atoms, other groups such as halogen atoms, carboxyl groups, hydrocarbon groups having 1 to 20 carbon atoms, alkoxy groups having 1 to 20 carbon atoms, ester groups having 2 to 20 carbon atoms, halogenated hydro-carbon groups having 1 to 20 carbon atoms, alkylsilyl groups having 1 to 20 carbon atoms or the like.

Accordingly, the above-mentioned preferable transition metal compound (A) is more specifically represented by one of the following general formulas (a) to (c):

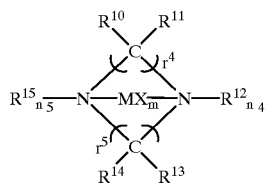
(a)

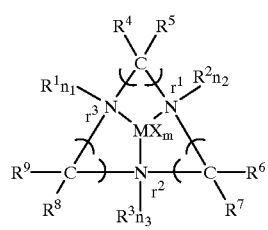
(b)

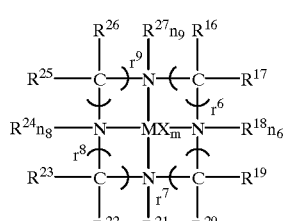
(c)

wherein $r^1$ to $r^9$ are integers of 1 to 20 and may be the same as or different from one another; $n_1$ to $n_9$ are 0 or 1; $R^1$ to $R^{27}$ may be the same as or different from one another and each represents independently a hydrogen atom, a hydrocarbon group having 1 to 20 carbon atoms, an alkoxy group having 1 to 20 carbon atoms, a carboxy group, an ester group having 2 to 20 carbon atoms, a halogen atom, a halogenated hydrocarbon group having 1 to 20 carbon atoms or an alkylsilyl group having 1 to 20 carbon atoms; M is a metal of Group 3 to 10, preferably 3 to 5, or the lanthanum series of the Periodic Table; X is a σ-bonding ligand such as halogen atom, a hydrogen atom and a hydrocarbon group having 1 to 20 carbon atoms, or a chelate ligand; m is an integer of 0 to 3 satisfying the equation [(number of N's bonded to M)+m=(oxidation number of M)].

In the above general formula, the above-mentioned preferable transition metal compound (A) is more concretely represented by one of the following general formulas (3a) to (3c), (4a) to (4d) and (5a) to (5e) depending upon the number of the nitrogen atoms contained in the main chain skelton of the cyclic amide and the number of the nitrogen atoms σ-bonded to the center transition metal:

(3a)

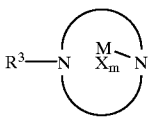
(3b)

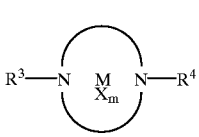
(3c)

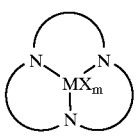
(4a)

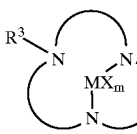
(4b)

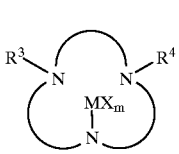
(4c)

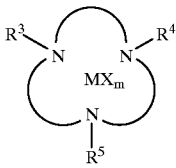
(4d)

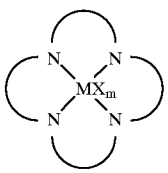
(5a)

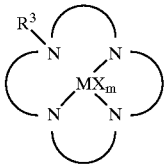
(5b)

(5c)

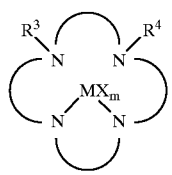

(5d)

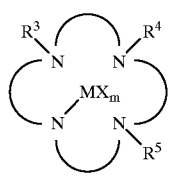

(5e)

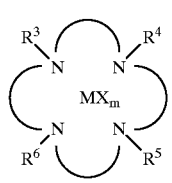

wherein $R^1$ to $R^6$ may be the same as or different from one another and each represents independently hydrogen atoms, hydrocarbon groups having 1 to 20 carbon atoms, alkoxy groups having 1 to 20 carbon atoms, carboxyl groups, ester groups having 2 to 20 carbon atoms, halogen atoms, halogenated hydrocarbon groups having 1 to 20 carbon atoms or alkylsilyl groups having 1 to 20 carbon atoms; M is a metal of Groups 3 to 10, preferably 3 to 5, or the lanthanum series of the Periodic Table; X is a σ-bonding ligand such as a halogen atom, a hydrogen atom and a hydrocarbon group having 1 to 20 carbon atoms, or a chelate ligand; m is an integer of 0 to 3 and satisfies the equation [(number of nitrogen atoms σ-bonded to M)+m=(oxidation number of M)]. Incidentally, the curves connecting the nitrogen atoms to one another represent saturated bonds.

In this invention, the transition metal compound (A) is more preferably a compound represented by the following general formula (b) in which the number of the nitrogen atoms contained in the main chain skeleton of the cyclic amide ligand is 3:

(b)

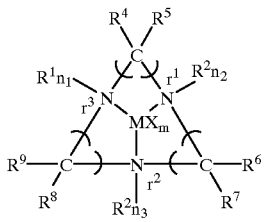

wherein $r^1$ to $r^3$ are integers of 1 to 20 and may be the same as or different from one another; $n_1$ to $n_3$ are 0 or 1; $R^1$ to $R^9$ may be the same as or different from one another and each represents independently a hydrogen atom, a hydrocarbon group having 1 to 20 carbon atoms, an alkoxy group having 1 to 20 carbon atoms, a carboxyl group, an ester group having 2 to 20 carbon atoms, a halogen atom, a halogenated hydrocarbon group having 1 to 20 carbon atoms or an alkylsilyl group having 1 to 20 carbon atoms; M is a metal of Groups 3 to 10, preferably 3 to 5 or the lanthanum series of the Periodic Table; X is a σ-bonding ligand or a chelate ligand; m is an integer of 0 to 3 satisfying the equation [(number of N's bonded to M)+m=oxidation number of M].

In the above general formula, the above-mentioned preferable transition metal compound (A) is more concretely represented by one of the following general formulas (4a) to (4d) depending upon the numbers of the nitrogen atoms contained in the main chain skelton of the cyclic amide ligand and the number of the nitrogen atoms σ-bonded to the center transition metal:

(4a)

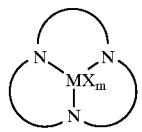

(4b)

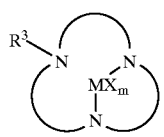

(4c)

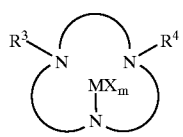

(4d)

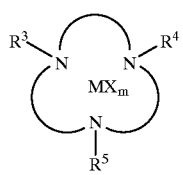

wherein $R^1$ to $R^6$ may be the same as or different from one another and each represents independently hydrogen atoms, hydrocarbon groups having 1 to 20 carbon atoms, alkoxy groups having 1 to 20 carbon atoms, carboxyl groups, ester groups having 2 to 20 carbon atoms, halogen atoms, halogenated hydrocarbon groups having 1 to 20 carbon atoms or alkylsilyl groups having 1 to 20 carbon atoms; M is a metal of Groups 3 to 10, preferably 3 to 5, or the lanthanum series of the Periodic Table; X is a σ-bonding ligand such as a halogen atom, a hydrogen atom and a hydrocarbon group having 1 to 20 carbon atoms, or a chelate ligand; m is an integer of 0 to 3 and satisfies the equation [(number of nitrogen atoms σ-bonded to M)+m=(oxidation number of M)]. Incidentally, the curves connecting the nitrogen atoms to one another represent saturated bonds.

More preferable transition metal compound (A) is represented by one of the following general formulas (6a) to (6h):

(6a)

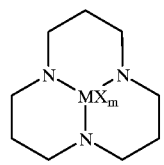

-continued (6b)
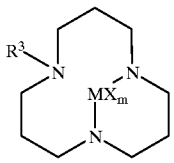

(6c)
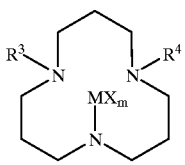

(6d)
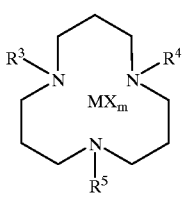

(6e)
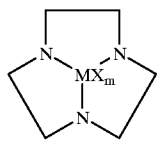

(6f)
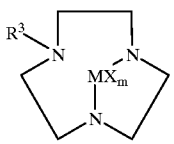

(6g)
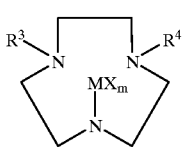

(6h)
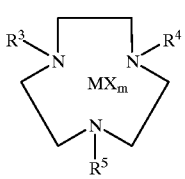

wherein the straight line connecting the nitrogen atoms to one another means a carbon chain which is saturated with hydrogen; the straight line connecting the center transition metal M to the nitrogen atom means a σ-bond; the nitrogen atoms which are not σ-bonded to the center transition metal may coordinate to the center transition metal; M is a metal of Group 3 to 10, preferably 3 to 5, or the lanthanum series of the Periodic Table; X is a σ-bonding ligand such as a halogen atom, a hydrogen atom, a hydrocarbon group having 1 to 20 carbon atoms, or a chelate ligand; m is an integer of 0 to 3 and satisfies the equation [(number of nitrogen atoms σ-bonded to M)+m=(oxidation number of M)].

The center transition metal M is preferably such an element as Ti, Zr, Hf, V, Ta, Nb, Ni, Pd, Co, Ru, Rh, Sm or Y, more preferably, Ti, Zr or Hf. X includes, as the σ-bonding ligand, halogen atoms, hydrogen atom, hydrocarbon groups having 1 to 20 carbon atoms, halogenated alkyl groups having 1 to 20 carbon atoms, hydroxyl group, carboxyl group and the like and, as the chelate ligand, ether compounds, cyclic ether compounds, carbonyl compounds, boron halide compounds, alkyl-phosphine compounds having 1 to 20 carbon atoms and the like. In particular, halogen atoms, hydrogen atom and hydrocarbon groups having 1 to 20 carbon atoms are preferable. m is an integer of 0 to 3 and satisfies the equation [(number of nitrogen atoms σ-bonded to M)+m=(oxidation number of M)].

Representative examples of such transition metal compounds (A) represented by the general formula (3a) include 1,3-diazacyclobutenyltitanium dichloride, 1,4-diazacyclohexanyltitanium dichloride, 1,5-diazacyclooctanyltitanium dichloride, 1,6-dizacyclodecanyltitanium dichloride, (2-methyl)-1,4-diazacyclohexanyltitanium dichloride, (2-methyl)-1,5-diazacyclooctanyltitanium dichloride, (2-phenyl)-1,4-diazacyclohexanyltitanium dichloride, (2-phenyl)-1,5-diazacyclooctanyltitanium dichloride, (2-acetyl)-1,4-diazacyclohexanyltitanium dichloride, (2-acetyl)-1,5-diazacyclooctanyltitanium dichloride and the like.

The transition metal compounds (A) represented by the general formula (3b) include N-methyl-1,3-diazacyclobutenyltitanium trichloride, N-methyl-1,4-diazacyclohexanyltitanium trichloride, N-methyl-1,5-diazacyclooctanyltitanium trichloride, N-methyl-1,6-diazacyclododecanyltitanium trichloride, N-methyl-(2-methyl)-1,4-diazacyclohexanyltitanium trichloride, N-methyl-(2-methyl)-1,5-diazacyclooctanyltitanium trichloride, N-methyl-(2-phenyl)-1,4-diazacyclohexanyltitanium trichloride, N-methyl-(2-phenyl)-1,5-diazacyclooctanyltitanium trichloride, (2-(acetyl)-1,4-diazacyclohexanyltitanium trichloride, N-methyl-(2-acetyl)-1,5-diazacyclooctanyltitanium trichloride and the like.

The transition metal compounds (A) represented by the general formula (4a) include 1,3,5-triazacyclohexanyltitanium chloride, 1,4,7-triazacyclononanyltitanium chloride, 1,5,9-triazacyclododecanyltitanium chloride, 1,6,11-triazacyclopentadecanyltitanium chloride, 1,7,13-triazacyclooctadecanyltitanium chloride, (2-methyl)-1,4,7-triazacyclononanyltitanium chloride, (2-methyl)-1,5,9-triazacyclododecanyltitanium chloride, (2-phenyl)-1,4,7-triazacyclononanyltitanium chloride, (2-phenyl)-1,5,9-triazacyclododecanyltitanium chloride, (2-acetyl)-1,4,7-triazacyclononanyltitanium chloride, (2-acetyl)-1,5,9-triazacyclododecanyltitanium chloride, (2-trifluoromethyl)-1,4,7-triazacyclononanyltitanium chloride, (2-trifluoromethyl)-1,5,9-triazacyclododecanyltitanium chloride, (2-methoxy)-1,4,7-triazacyclononanyltitanium chloride, (2-methoxy)-1,5,9-triazacyclododecanyltitanium chloride, (2-phenoxy)-1,4,7-triazacyclononanyltitanium chloride, (2-phenoxy)-1,5,9-triazacyclododecanyltitanium chloride, (2,5,8-trimethyl)-1,4,7-triazacyclononanyltitanium chloride, (2,6,10-trimethyl)-1,5,9-triazacyclododecanyltitanium chloride, (2,5,8-triphenyl)-1,4,7-triazacyclononanyltitanium chloride, (2,6,10-triphenyl)-1,5,9-triazacyclododecanyltitanium chloride, (2,5,8-triacetyl)-1,4,7-triazacyclononanyltitanium chloride, (2,6,10-triacetyl)-1,5,9-triazacyclododecanyltitanium chloride, (2,5,8-tritrifluoromethyl)-1,4,7-triazacyclononanyltitanium chloride, (2,6,10-tritrifluoromethyl)-1,5,9-triazacyclododecanyltitanium chloride, (2,5,8-trimethoxy)-

1,4,7-triazacyclononanyltitanium chloride, (2,6,10-trimethoxy)-1,5,9-triazacyclododecanyltitanium chloride, (2,5,8-triphenoxy)-1,4,7-triazacyclononanyltitanium chloride, (2,6,10-triphenoxy)-1,5,9-triazacyclododecanyltitanium chloride and the like.

The transition metal compounds (A) represented by the general formula (4b) include N-methyl-1,3,5-triazacyclohexanyltitanium dichloride, N-methyl-1,4,7-triazacyclononanyltitanium dichloride, N-methyl-1,5,9-triazacyclododecanyltitanium dichloride, N-methyl-1,6,11-triazacyclopentadecanyltitanium dichloride, N-methyl-1,7,13-triazacyclooctadecanyltitanium dichloride, N-methyl-(2-methyl)-1,4,7-triazacyclononanyltitanium dichloride, N-methyl-(2-methyl)-1,5,9-triazacyclododecanyltitanium dichloride, N-methyl-(2-phenyl)-1,4,7-triazacyclononanyltitanium dichloride, N-methyl-(2-phenyl)-1,5,9-triazacyclododecanyltitanium dichloride, N-methyl-(2-acetyl)-1,4,7-triazacyclononanyltitanium dichloride, N-methyl-(2-acetyl)-1,5,9-triazacyclododecanyltitanium dichloride, N-methyl-(2-trifluoromethyl)-1,4,7-triazacyclononanyltitanium dichloride, N-methyl-(2-trifluoromethyl)-1,5,9-triazacyclododecanyltitanium dichloride, N-methyl-(2-methoxy)-1,4,7-triazacyclononanyltitanium dichloride, N-methyl-(2-methoxy)-1,5,9-triazacyclododecanyltitanium dichloride, N-methyl-(2-phenoxy)-1,4,7-triazacyclononanyltitanium dichloride, N-methyl-(2-phenoxy)-1,5,9-triazacyclododecanyltitanium dichloride, N-methyl-(2,5,8-trimethyl)-1,4,7-triazacyclononanyltitanium dichloride, N-methyl-(2,6,10-trimethyl)-1,5,9-triazacyclododecanyltitanium dichloride, N-methyl-(2,5,8-triphenyl)-1,4,7-triazacyclononanyltitanium dichloride, N-methyl-(2,6,10-triphenyl)-1,5,9-triazacyclododecanyltitanium dichloride, N-methyl-(2,5,8-triacetyl)-1,4,7-triazacyclononanyltitanium dichloride, N-methyl-(2,6,10-triacetyl)-1,5,9-triazacyclododecanyltitanium dichloride, N-methyl-(2,5,8-tritrifluoromethyl)-1,4,7-triazacyclononanyltitanium dichloride, N-methyl-(2,6,10-tritrifluoromethyl)-1,5,9-triazacyclododecanyltitanium dichloride, N-methyl-(2,5,8-trimethoxy)-1,4,7-triazacyclononanyltitanium dichloride, N-methyl-(2,6,10-trimethoxy)-1,5,9-triazacyclododecanyltitanium dichloride, N-methyl-(2,5,8-triphenoxy)-1,4,7-triazacyclononanyltitanium dichloride, N-methyl-(2,6,10-triphenoxy)-1,5,9-triazacyclododecanyltitanium dichloride and the like.

The transition metal compounds (A) represented by the general formula (4c) include N-methyl-N'-methyl-1,3,5-triazacyclohexanyltitanium trichloride, N-methyl-N'-methyl-1,4,7-triazacyclononanyltitanium trichloride, N-methyl-N'-methyl-1,5,9-triazacyclododecanyltitanium trichloride, N-methyl-N'-methyl-1,6,11-triazacyclopentadecanyltitanium trichloride, N-methyl-N'-methyl-1,7,13-triazacyclooctadecanyltitanium trichloride, N-methyl-N'-methyl-(2-methyl)-1,4,7-triazacyclononanyltitanium trichloride, N-methyl-N'-methyl-(2-methyl)-1,5,9-triazacyclododecanyltitanium trichloride, N-methyl-N'-methyl-(2-phenyl)-1,4,7-triazacyclononanyltitanium trichloride, N-methyl-N'-methyl-(2-phenyl)-1,5,9-triazacyclododecanyltitanium trichloride, N-methyl-N'-methyl-(2-acetyl)-1,4,7-triazacyclononanyltitanium trichloride, N-methyl-N'-methyl-(2-acetyl)-1,5,9-triazacyclododecanyltitanium trichloride, N-methyl-N'-methyl-(2-trifluoromethyl)-1,4,7-triazacyclononanyltitanium trichloride, N-methyl-N'-methyl-(2-trifluoromethyl)-1,5,9-triazacyclododecanyltitanium trichloride, N-methyl-N'-methyl-2-(methoxy)-1,4,7-triazacyclononanyltitanium trichloride, N-methyl-N'-methyl-(2-methoxy)-1,5,9-triazacyclododecanyltitanium trichloride, N-methyl-N'-methyl-(2-phenoxy)-1,4,7-triazacyclononanyltitanium trichloride, N-methyl-N'-methyl-(2-phenoxy)-1,5,9-triazacyclododecanyltitanium trichloride, N-methyl-N'-methyl-(2,5,8-trimethyl)-1,4,7-triazacyclononanyltitanium trichloride, N-methyl-N'-methyl-(2,6,10-trimethyl)-1,5,9-triazacyclododecanyltitanium trichloride, N-methyl-N'-methyl-(2,5,8-triphenyl)-1,4,7-triazacyclononanyltitanium trichloride, N-methyl-N'-methyl-(2,6,10-triphenyl)-1,5,9-triazacyclododecanyltitanium trichloride, N-methyl-N'-methyl-(2,5,8-triacetyl)-1,4,7-triazacyclononanyltitanium trichloride, N-methyl-N'-methyl-(2,6,10-triacetyl)-1,5,9-triazacyclododecanyltitanium trichloride, N-methyl-N'-methyl-(2,5,8-tritrifluoromethyl)-1,4,7-triazacyclononanyltitanium trichloride, N-methyl-N'-methyl-(2,6,10-tritrifluoromethyl)-1,5,9-triazacyclododecanyltitanium trichloride, N-methyl-N'-methyl-(2,5,8-trimethoxy)-1,4,7-triazacyclononanyltitanium trichloride, N-methyl-N'-methyl-(2,6,10-trimethoxy)-1,5,9-triazacyclododecanyltitanium trichloride, N-methyl-N'-methyl-(2,5,8-triphenoxy)-1,4,7-triazacyclononanyltitanium trichloride, N-methyl-N'-methyl-(2,6,10-triphenoxy)-1,5,9-triazacyclododecanyltitanium trichloride and the like.

The transition metal compounds (A) represented by the general formula (5a) include 1,3,5,7-tetraazacyclooctanyltitanium, 1,4,7,10-tetraazacyclododecanyltitanium, 1,5,9,13-tetraazacyclohexadecanyltitanium, 1,6,11,16-tetraazacycloeicosanyltitanium, (2-methyl)-1,4,7,10-tetraazacyclododecanyltitanium, (2-methyl)-1,5,9,13-tetraazacyclohexadecanyltitanium, (2-phenyl)-1,4,7,10-tetraazacyclododecanyltitanium, (2-phenyl)-1,5,9,13-tetraazacyclohexadecanyltitanium, (2-acetyl)-1,4,7,10-tetraazacyclododecanyltitanium, (2-acetyl)-5 1,5,9,13-tetraazacyclohexadecanyltitanium, (2-fluoro)-1,4,7,10-tetraazacyclododecanyltitanium, (2-fluoro)-1,5,9,13-tetraazacyclohexadecanyltitanium, (2-trifluoromethyl)-1,4,7,10-tetraazacyclododecanyltitanium, (2-trifluoromethyl)-1,5,9,13-tetraazacyclohexadecanyltitanium, (2-methoxy)-1,4,7,10-tetraazacyclododecanyltitanium, (2-methoxy)-1,5,9,13-tetraazacyclohexadecanyltitanium, (2,5,8,11-tetramethyl)-1,4,7,10-tetraazacyclododecanyltitanium, (2,6,10,14-tetramethyl)-1,5,9,13-tetraazacyclohexadecanyltitanium, (2,5,8,11-tetraphenyl)-1,4,7,10-tetraazacyclododecanyltitanium, (2,6,10,14-tetraphenyl)-1,5,9,13-tetraazacyclohexadecanyltitanium, (2,5,8,11-tetraacetyl)-1,4,7,10-tetraazacyclododecanyltitanium, (2,6,10,14-tetraacetyl)-1,5,9,13-tetraazacyclohexadecanyltitanium, (2,5,8,11-tetrafluoro)-1,4,7,10-tetraazacyclododecanyltitanium, (2,6,10,14-tetrafluoro)-1,5,9,13-tetraazacyclohexadecanyltitanium, (2,5,8,11-tetratrifluoromethyl)-1,4,7,10-tetraazacyclododecanyltitanium, (2,6,10,14-tetratrifluoromethyl)-1,5,9,13-tetraazacyclohexadecanyltitanium, (2,5,8,11-tetramethoxy)-1,4,7,10-tetraazacyclododecanyltitanium, (2,6,10,14-tetramethoxy)-1,5,9,13-tetraazacyclohexadecanyltitanium and the like.

The transition metal compounds (A) represented by the general formula (5b) include N-methyl-1,3,5,7-tetraazacyclooctanyltitanium chloride, N-methyl-1,4,7,10- tetraazacyclododecanyltitanium chloride, N-methyl-1,5,9,13-tetraazacyclohexadecanyltitanium chloride, N-methyl-1,6,11,16-tetraazacycloeicosanyltitanium chloride, N-methyl-(2-methyl)-1,4,7,10-tetraazacyclododecanyltitanium chloride, N-methyl-(2-methyl)-1,5,9,13-tetraazacyclohexadecanyltitanium chloride, N-methyl-(2-phenyl)-1,4,7,10-tetraazacyclododecanyltitanium chloride, N-methyl-(2-phenyl)-1,5,9,13-tetraazacyclohexadecanyltitanium chloride, N-methyl-(2-acetyl)-1,4,7,10-tetraazacyclododecanyltitanium chloride, N-methyl-(2-acetyl)-1,5,9,13-tetraazacyclohexadecanyltitanium chloride, N-methyl-(2-fluoro)-1,4,7,10-tetraazacyclododecanyltitanium chloride, N-methyl-(2-fluoro)-1,5,9,13-tetraazacyclohexadecanyltitanium chloride, N-methyl-(2-trifluoromethyl)-1,4,7,10-tetraazacyclododecanyltitanium chloride, N-methyl-(2-trifluoromethyl)-1,5,9,13-tetraazacyclohexadecanyltitanium chloride, N-methyl-(2-methoxy)-1,4,7,10-tetraazacyclododecanyltitanium chloride, N-methyl-(2-methoxy)-1,5,9,13-tetraazacyclohexadecanyltitanium chloride, N-methyl-(2,5,8,11-tetramethyl)-1,4,7,10-tetraazacyclododecanyltitanium chloride, N-methyl-(2,6,10,14-tetramethyl)-1,5,9,13-tetraazacyclohexadecanyltitanium chloride, N-methyl-(2,5,8,11-tetraphenyl)-1,4,7,10-tetraazacyclododecanyltitanium chloride, N-methyl-(2,6,10,14-tetraphenyl)-1,5,-9,13-tetraazacyclohexadecanyltitanium chloride, N-methyl-(2,5,8,11-tetraacetyl)-1,4,7,10-tetraazacyclododecanyltitanium chloride, N-methyl-(2,6,10,14-tetraacetyl)-1,5,-9,13-tetraazacyclohexadecanyltitanium chloride, N-methyl-(2,5,8,11-tetrafluoro)-1,4,7,10-tetraazacyclododecanyltitanium chloride, N-methyl-(2,6,10,14-tetrafluoro)-1,5,9,13-tetraazacyclohexadecanyltitanium chloride, N-methyl-(2,5,8,11-tetratrifluoromethyl)-1,4,7,10-tetraazacyclododecanyltitanium chloride, N-methyl-(2,6,10,14-tetratrifluoromethyl)-1,5,9,13-tetraazacyclohexadecanyltitanium chloride, N-methyl-(2,5,8,11-tetramethoxy)-1,4,7,10-tetraazacyclododecanyltitanium chloride, N-methyl-(2,6,10,14-tetramethoxy)-1,5,9,13-tetraazacyclohexadecanyltitanium chloride and the like.

The transition metal compounds (A) represented by the general formula (5c) include N-methyl-N'-methyl-1,3,5,7-tetraazacyclooctanyltitanium dichloride, N-methyl-N'-methyl-1,4,7,10-tetraazacyclododecanyltitanium dichloride, N-methyl-N'-methyl-1,5,9,13-tetraazacyclohexadecanyltitanium dichloride, N-methyl-N'-methyl-1,6,11,16-tetraazacycloeicosanyltitanium dichloride, N-methyl-N'-methyl-(2-methyl)-1,4,7,10-tetraazacyclododecanyltitanium dichloride, N-methyl-N'-methyl-(2-methyl)-1,5,9,13-tetraazacyclohexadecanyltitanium dichloride, N-methyl-N'-methyl-(2-phenyl)-1,4,7,10-tetraazacyclododecanyltitanium dichloride, N-methyl-N'-methyl-(2-phenyl)-1,5,9,13-tetraazacyclohexadecanyltitanium dichloride, N-methyl-N'-methyl-(2-acetyl)-1,4,7,10-tetraazacyclododecanyltitanium dichloride, N-methyl-N'-methyl-(2-acetyl)-1,5,9,13-tetraazacyclohexadecanyltitanium dichloride, N-methyl-N'-methyl-(2-fluoro)-1,4,7,10-tetraazacyclododecanyltitanium dichloride, N-methyl-N'-methyl-(2-fluoro)-1,5,9,13-tetraazacyclohexadecanyltitanium dichloride, N-methyl-N'-methyl-(2-trifluoromethyl)-1,4,7,10-tetraazacyclododecanyltitanium dichloride, N-methyl-N'-methyl-(2-trifluoromethyl)-1,5,9,13-tetraazacyclohexadecanyltitanium dichloride, N-methyl-N'-methyl-(2-methoxy)-1,4,7,10-tetraazacyclododecanyltitanium dichloride, N-methyl-N'-methyl-(2-methoxy)-1,5,9,13-tetraazacyclohexadecanyltitanium dichloride, N-methyl-N'-methyl-(2,5,8,11-tetramethyl)-1,4,7,10-tetraazacyclododecanyltitanium dichloride, N-methyl-N'-methyl-(2,6,10,14-tetramethyl)-1,5,9,13-tetraazacyclohexadecanyltitanium dichloride, N-methyl-N'-methyl-(2,5,8,11-tetraphenyl)-1,4,7,10-tetraazacyclododecanyltitanium dichloride, N-methyl-N'-methyl-(2,6,10,14-tetraphenyl)-1,5,9,13-tetraazacyclohexadecanyltitanium dichloride, N-methyl-N'-methyl-(2,5,8,11-tetraacetyl)-1,4,7,10-tetraazacyclododecanyltitanium dichloride, N-methyl-N'-methyl-(2,6,10,14-tetraacetyl)-1,5,9,13-tetraazacyclohexadecanyltitanium dichloride, N-methyl-N'-methyl-(2,5,8,11-tetrafluoro)-1,4,7,10-tetraazacyclododecanyltitanium dichloride, N-methyl-N'-methyl-(2,6,10,14-tetrafluoro)-1,5,9,13-tetraazacyclohexadecanyltitanium dichloride, N-methyl-N'-methyl-(2,5,8,11-tetratrifluoromethyl)-1,4,7,10-tetraazacyclododecanyltitanium dichloride, N-methyl-N'-methyl-(2,6,10,14-tetratrifluoromethyl)-1,5,9,13-tetraazacyclohexadecanyltitanium dichloride, N-methyl-N'-methyl-(2,5,8,11-tetramethoxy)-1,4,7,10-tetraazacyclododecanyltitanium dichloride, N-methyl-N'-methyl-(2,6,10,14-tetramethoxy)-1,5,9,13-tetraazacyclohexadecanyltitanium dichloride and the like.

The transition metal compounds (A) represented by the general formula (5d) include N-methyl-N'-methyl-N"-methyl-1,3,5,7-tetraazacyclooctanyltitanium trichloride, N-methyl-N'-methyl-N"-methyl-1,4,7,10-tetraazacyclododecanyltitanium trichloride, N-methyl-N'-methyl-N"-methyl-1,5,9,13-tetraazacyclohexadecanyltitanium trichloride, N-methyl-N'-methyl-N"-methyl-1,6,11,16-tetraazacycloeicosanyltitanium trichloride, N-methyl-N'-methyl-N"-methyl-(2-methyl)-1,4,7,10-tetraazacyclododecanyltitanium trichloride, N-methyl-N'-methyl-N"'-methyl-(2-methyl)-1,5,9,13-tetraazacyclohexadecanyltitanium trichloride, N-methyl-N'-methyl-N"-methyl-(2-phenyl)-1,4,7,10-tetraazacyclododecanyltitanium trichloride, N-methyl-N'-methyl-N"-methyl-(2-phenyl)-1,5,9,13-tetraazacyclohexadecanyltitanium trichloride, N-methyl-N'-methyl-N"-methyl-(2-acetyl)-1,4,7,10-tetraazacyclododecanyltitanium trichloride, N-methyl-N'-methyl-N"-methyl-(2-acetyl)-1,5,9,13-tetraazacyclohexadecanyltitanium trichloride, N-methyl-N'-methyl-N"-methyl-(2-fluoro)-1,4,7,10-tetraazacyclododecanyltitanium trichloride, N-methyl-N'-methyl-N"-methyl-(2-fluoro)-1,5,9,13-tetraazacyclohexadecanyltitanium trichloride, N-methyl-N'-methyl-N"-methyl-(2-trifluoromethyl)-1,4,7,10-tetraazacyclododecanyltitanium trichloride, N-methyl-N'-methyl-N"-methyl-(2-trifluoromethyl)-1,5,9,13-tetraazacyclohexadecanyltitanium trichloride, N-methyl-N'-methyl-N"-methyl-(2-methoxy)-1,4,7,10-tetraazacyclododecanyltitanium trichloride, N-methyl-N'-methyl-N"-methyl-(2-methoxy)-1,5,9,13-tetraazacyclohexadecanyltitanium trichloride, N-methyl-N"-methyl-(2,5,8,11-tetramethyl)-1,4,7,10-tetraazacyclododecanyltitanium trichloride, N-methyl-N"-methyl-(2,6,10,14-tetramethyl)-1,5,9,13-tetraazacyclohexadecanyltitanium trichloride, N-methyl-N"-methyl-(2,5,8,11-tetraphenyl)-1,4,7,10-tetraazacyclododecanyltitanium trichloride, N-methyl-N"-methyl-(2,6,10,14-tetraphenyl)-1,5,9,13-tetraazacyclohexadecanyltitanium trichloride, N-methyl-N'- methyl-N"-methyl-(2,5,8,11-tetraacetyl)-1,4,7,10-tetraazacyclododecanyltitanium trichloride, N-methyl-N'-methyl-N"-methyl-(2,6,10,14-tetraacetyl)-1,5,9,13-tetraazacyclohexadecanyltitanium trichloride, N-methyl-N'-methyl-N"-methyl-(2,5,8,11-tetrafluoro)-1,4,7,10-tetraazacyclododecanyltitanium trichloride, N-methyl-N'-methyl-N"-methyl-(2,6,10,14-tetrafluoro)-1,5,9,13-tetraazacyclohexadecanyltitanium trichloride, N-methyl-N'-methyl-N"-methyl-(2,5,8,11-tetratrifluoromethyl)-1,4,7,10-tetraazacyclododecanyltitanium trichloride, N-methyl-N'-methyl-N"-methyl-(2,6,10,14-tetratrifluoromethyl)-1,5,9,13-tetraazacyclohexadecanyltitanium trichloride, N-methyl-N'-methyl-N"-methyl-(2,5,8,11-tetramethoxy)-1,4,7,10-tetraazacyclododecanyltitanium trichloride, N-methyl-N'-methyl-N"-methyl-(2,6,10,14-tetramethoxy)-1,5,9,13-tetraazacyclohexadecanyltitanium trichloride and the like.

In addition to the compounds represented by the general formulas (3a) to (3c), (4a) to (4d) and (5a) to (5e) and illustrated above, there can be suitably used those compounds in which at least one of the methyl groups bonded to the nitrogen atom (N-methyl groups) has been replaced by a phenyl group, a benzyl group, an acetyl group, a trifluoroacetyl group, a trifluoromethyl group, a methoxy group, a phenoxy group, a cyano group, a halogen atom (such as fluorine atom, chlorine atom, bromine atom, iodine atom or the like), or the like; those compounds in which the chlorine atom has been replaced by a bromine atom, an amido group, an alkoxy group or the like; and those compounds in which the center transition metal is not titanium but zirconium, hafnium, vanadium, tantalum, nickel, palladium, cobalt, ruthenium, rhodium or a lanthanum series metal; etc.

In this invention, the transition metal compounds (A) may be used alone or in combination of two or more.

The compound (B) in this invention is an organoaluminum compound represented by the above-mentioned general formula (1) or an aluminoxane compound or a mixture of the two.

The details of the structure of the aluminoxane compound have not been clarified; however, can be inferred to be a linear, cyclic or cluster-like compound or a mixture thereof.

In the general formula (1), $R^1$ is preferably a methyl group, an ethyl group, an n-propyl group, a t-butyl group, an isobutyl group, an n-hexyl group, an n-octyl group, a phenyl group or a benzyl group, particularly preferably a methyl group, an ethyl group, a t-butyl group or an isobutyl group.

The alkoxy group as Z is preferably a methoxy group, an ethoxy group, an n-propoxy group or an n-butoxy group, particularly preferably a methoxy group, an ethoxy group or an n-butoxy group. The halogen as Z is preferably a chlorine atom or a bromine atom.

In the general formula (1), when plural $R^1$ or Z groups are present, the plural $R^1$ groups may the same as or different from one another and the plural Z groups may be the same as or different from one another.

Specific examples of the compound (B) include, in the case of the general formula (1), trialkylaluminums such as trimethylaluminum, triethylaluminum, tributylaluminum, triisopropylaluminum, triisobutylaluminum, tri-t-butylaluminum, triamylaluminum and the like; alkylaluminum halides such as diisopropylaluminum chloride, isopropylaluminum dichloride, diisobutylaluminum chloride, isobutylaluminum dichloride, di-t-butylaluminum chloride, t-butylaluminum dichloride, diamylaluminum chloride, amylaluminum dichloride, triethyldialuminum trichloride and the like; alkylaluminum hydrides such as dimethylaluminum hydride, diisobutylaluminum hydride, dioctylaluminum hydride and the like; alkylaluminum alkoxides such as methylaluminum dimethoxide, diisobutylaluminum methoxide, isobutylaluminum ethoxide and the like. These compounds may be used alone or in combination of two or more.

The aluminoxane compounds include tetramethyl dialuminoxane, tetraethyl dialuminoxane, tetrabutyl dialuminoxane, tetrahexyl aluminoxane, methyl aluminoxane, ethyl aluminoxane, butyl aluminoxane, hexyl aluminoxane and the like. These compounds may be used alone or in combination of two or more.

As the compound (B), from the viewpoint of catalyst activity, preferable are trialkylaluminums such as trimethylaluminum, triethylaluminum, triisobutylaluminum and the like with respect to the general formula (1), and methyl aluminoxane with respect to the aluminoxane compound.

Moreover, the ionic compound (C) is a compound which has in the molecule both at least one anion and at least one cation and is present as an ion in a solvent or medium used during the polymerization of an olefin with the olefin-polymerizing catalyst of this invention.

Representative examples of said ionic compound (C) are compounds represented by the general formula (i):

$$([L]^{k+})_p([M'A^1A^2 \ldots A^n]^-)_q \qquad (i)$$

wherein $[L]^{k+}$ is a Brønsted acid or a Lewis acid; M' is an element of Groups 13 to 15 of the Periodic Table; each of $A^1$, $A^2$, ... $A^n$ is independently a hydrogen atom, a halogen atom, an alkyl group having 1 to 20 carbon atoms, a dialkylamino group having 1 to 30 carbon atoms, an alkoxy group having 1 to 20 carbon atoms, an aryl group having 6 to 40 carbon atoms, an aryloxy group having 6 to 40 carbon atoms, an alkaryl group having 7 to 40 carbon atoms, an aralkyl group having 7 to 40 carbon atoms, a halogen-substituted hydrocarbon group having 1 to 40 carbon atoms, an acyloxy group having 1 to 20 carbon atoms or an organic metalloid group; k is the ionic valence of L and is an integer of 1 to 3; p is an integer of not less than 1; and q=(k×p).

Specific examples of the ionic compound (C) include trimethylammonium tetraphenylborate, triethylammonium tetraphenylborate, tributylammonium tetraphenylborate, methyl(dibutyl)ammonium tetraphenylborate, dimethylanilinium tetraphenylborate, methylpyridinium tetraphenylborate, methyl(2-cyanopyridinium) tetraphenylborate, methyl(4-cyanopyridinium) tetraphenylborate, trimethylammonium tetrakis(pentafluorophenyl)borate, triethylammonium tetrakis(pentafluorophenyl)borate, tributylammonium tetrakis(pentafluorophenyl)borate, methyl(dibutyl)ammonium tetrakis(pentafluorophenyl)borate, dimethylanilinium tetrakis(pentafluorophenyl)borate, methylpyridinium tetrakis(pentafluorophenyl)borate, methyl(2-cyanopyridinium) tetrakis(pentafluorophenyl)borate, methyl (4-cyanopyridinium) tetrakis(pentafluorophenyl)borate, dimethylanilinium tetrakis[bis(3,5-ditrifluoromethyl) phenyl]borate, ferrocenium tetraphenylborate, silver tetraphenylborate, ferrocenium tetrakis(pentafluorophenyl) borate and the like. Among these compounds, dimethylanilinium tetrakis(pentafluorophenyl)borate is particularly preferred from the viewpoint of catalyst activity. These ionic compounds (C) may be used alone or in admixture of two or more.

The catalyst system comprising the above-mentioned compounds (A) and (B) or the above-mentioned compounds (A), (B) and (C) can be used in the state that at least one of the compounds is supported on a suitable carrier. The kind of this carrier is not critical, and inorganic oxide carriers, other inorganic carriers than the inorganic oxide carriers, and organic carriers can all be used. The supporting method is not critical and any known method may be appropriately utilized.

In the case of the olefin-polymerizing catalyst of this invention comprising the compounds (A) and (B), it is particularly preferable that the compound (A) is used in combination with an aluminoxane compound. In addition, in the case of the catalyst comprising the compounds (A), (B) and (C), it is particularly preferable that the transition metal compound (A) is used in combination with an organoaluminum compound represented by the general formula (1), particularly a trialkylaluminum, as the compound (B) and dimethylanilinium tetrakis(pentafluorophenyl)borate as the compound (C).

The molar proportions of the transition metal compound (A), the compound (B) and the ionic compound (C) are not critical; however, it is preferable that the transition metal compound (A): the compound (B)=1:0.01–1:20,000 and the compound (B): the ionic compound (C)=1:0.01–1:1,000.

When the olefin-polymerizing catalyst of this invention is used for the polymerization of an olefin, the transition metal compound (A), the compound (B) and the ionic compound (C) may be separately fed or at least two of them are fed in the state that they are previously contacted with each other.

An explanation is made below of a process for polymerizing an olefin with the olefin-polymerizing catalyst of this invention.

The olefin-polymerizing catalyst of this invention can be suitably used for homopolymerization of an olefin and copolymerization of olefins; however, particularly when it is used for the copolymerization of olefins, the excellent polymerization activity of the catalyst can be utilized sufficiently.

The (co)polymerization of olefins can be carried out in solution or even in slurry.

The solvent or medium which is used when the polymerization is carried out in solution or in slurry may be any solvent or medium which is generally used in the (co)polymerization of olefins. Specifically, there can be mentioned benzene, toluene, xylene, pentane, hexane, cyclohexane, methylene chloride and the like. The olefin per se may be used as the solvent. These solvents or mediums can be used alone or in admixture of two or more.

The polymerization temperature in the (co)polymerization of olefins is not critical and a temperature ranging from −100° C. to +300° C. can be adopted. However, a temperature of −20° C. to +20° C. is preferred. The polymerization pressure is not critical; however, it is preferably in the range of from about 0.5 to about 1,500 atm., more preferably in the range of from 1 to 500 atm. because it is industrial and economical.

The (co)polymerization reaction of olefins can be effected by a continuous system or a batchwise system. Moreover, a chain transfer agent such as hydrogen or the like can be added during the (co)polymerization for controlling the molecular weight.

The olefin used in the production of the olefin polymer of this invention may be any compound having an olefin in the α-position. As the olefin, there can be mentioned, for example, α-olefins having 2 to 30 carbon atoms, specifically, ethylene, propylene, 1-butene, 1-hexene, 4-methyl-1-pentene, 1-heptene, 1-octene, 1-decene and the like. Moreover, olefins having a polar group represented by the general formula (I) may also be used:

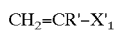
$$CH_2=CR'-X'_1 \qquad (I)$$

wherein R' is a hydrogen atom, a hydrocarbon group having 1 to 20 carbon atoms, a halogen atom, a halogenated hydrocarbon group having 1 to 20 carbon atoms or an alkylsilyl group having 1 to 20 carbon atoms; $X'_1$ is a substituent having at least one functional group selected from the group consisting of an ester group, a carboxyl group, a carbonyl group, a hydroxyl group, a nitrile group, an ether group, an amido group, an amino group, an imido group, a nitro group, a sulfone group, a sulfide group and a thioether group.

The compounds represented by the general formula (I) include (cyclo)alkyl acrylates such as methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, t-butyl (meth)acrylate, n-amyl (meth)acrylate, i-amyl (meth)acrylate, n-hexyl (meth)acrylate, 2-ethylhexyl (meth)acrylate, n-octyl (meth)acrylate, cyclohexyl (meth)acrylate and the like;

ethylenically unsaturated monomers having an aldo group including alkyl acrylamides, for example, N-monoalkyl acrylamides such as N-methyl acrylamide, N-ethyl acrylamide and the like, N-monoalkyl-N-monoalkyl acrylamides such as N-methyl-N-ethyl acrylamide and the like and N,N-dialkyl acrylamides such as N,N-dimethyl acrylamide, N,N-diethyl acrylamide and the like;

alkoxy(cyclo)alkyl (meth)acrylates such as 2-methoxyethyl (meth)acrylate, 2-ethoxyethyl (meth)acrylate, 2-methoxypropyl (meth)acrylate, 3-methoxypropyl (meth)acrylate, 2-methoxybutyl (meth)acrylate, 3-methoxybutyl (meth)acrylate, 4-methoxybutyl (meth)acrylate, p-methoxycyclohexyl (meth)acrylate and the like;

fluoroalkyl (meth)acrylates such as perfluoroethyl (meth)acrylate, perfluoropropyl (meth)acrylate, pentadecafluorooctyl (meth)acrylate and the like;

aminoalkyl group-containing (meth)acrylates such as 2-dimethylaminoethyl (meth)acrylate, 2-diethylaminoethyl (meth)acrylate, 2-dimethylaminopropyl (meth)acrylate, 3-dimethylaminopropyl (meth)acrylate and the like;

aminoalkoxyalkyl group-containing (meth)acrylates such as 2-(dimethylaminoethoxy)ethyl (meth)acrylate, 2-(diethylaminoethoxy)ethyl (meth)acrylate, 3-(dimethylaminoethoxy)propyl (meth)acrylate and the like;

carboxyl group-containing unsaturated monomers or their anhydrides such as (meth)acrylic acid, crotonic acid, cinnamic acid, maleic acid, maleic anhydride, fumaric acid, itaconic acid, monomethyl maleate, monoethyl maleate, monomethyl itaconate, mono-2-(meth)acryloyloxyethyl hexahydrophthalate and the like;

amides and imides of unsaturated carboxylic acids such as (meth)acrylamide, N-methoxymethyl (meth)acrylamide, N-butoxymethyl (meth)acrylamide, N,N-dimethoxymethyl (meth)acrylamide, N,N-methylene bis(meth)acrylamide, N,N-ethylene bis(meth)acrylamide, maleic acid amide, maleimide and the like; and cyano group-containing unsaturated monomers such as (meth)acrylonitrile, crotononitrile, 2-cyanoethyl (meth)acrylate, 2-cyanopropyl (meth)acrylate, 3-cyanopropyl (meth)acrylate, cinnamoylnitrile and the like.

Other monomers having a hydroxyl group include, for example, hydroxy(cyclo)alkyl mono(meth)acrylates of dihydric alcohols such as hydroxymethyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 5-hydroxyamyl (meth)acrylate, 6-hydroxyhexyl (meth)acrylate, 4-hydroxycyclohexyl (meth)acrylate, neopentylglycol mono (meth)acrylate and the like;

substituted hydroxy(cyclo)alkyl mono(meth)acrylates such as 3-chloro-2-hydroxypropyl (meth)acrylate, 3-amino-2-hydroxypropyl (meth)acrylate and the like;

free hydroxyl group-containing (meth)acrylates of trihydric or more polyhydric alcohols such as mono- or di-(meth)acrylate of glycerin, mono- or di-(meth)acrylate of trimethylolpropane, mono-, di- or tri-(meth)acrylate of pentaerythritol and the like;

N-methylolated unsaturated carboxylic acid amides such as N-methylol (meth)acrylamide, N,N-dimethylol (meth)acrylamide and the like.

Other monomers having a group which can be converted to a hydroxyl group include, for example, allyl glycidyl ether, glycidyl (meth)acrylate, methylglycidyl (meth)acrylate, epoxidized cyclohexyl (meth)acrylate and the like;

vinyl esters such as vinyl acetate, vinyl propionate, vinyl ester of versatic acid and the like; etc.

The above-mentioned monomers can be used alone or in admixture of two or more.

In this invention, the above-mentioned other monomers are preferably (meth)acrylic acid esters such as methyl (meth)acrylate, ethyl (meth)acrylate, n-butyl (meth)acrylate, cyclohexyl (meth)acrylate and the like and (meth)acrylonitrile.

Besides the above monomers, there can be used cyclic olefins and polar group-substituted cyclic olefins. They include, for example, norbornene; alkyl-, alkylidene- and aromatic-substituted derivatives of norbornene; and those substituted or unsubstituted cyclic olefins substituted by a polar group such as a halogen atom, a hydroxyl group, an ester group, an alkoxy group, a cyano group, an amido group, an imido group, a silyl group or the like. There may be used specifically 2-norbornene, 5-methyl-2-norbornene, 5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, 8-methyl-8-carboxymethyltetracyclo[4.4.0.1$^{2,5}$.1$^{7,10}$]-3-dodecene, 8-carboxymethyltetracyclo[4.4.0.1$^{2,5}$.1$^{7,10}$]-3-dodecene, 5-carboxymethylbicyclo[2.2.1]-2-heptene and the like; styrene; and derivatives of styrene.

Among them, there can be preferably used ethylene, propylene, butene, 1-hexene and 1-octene. As the polar olefins, preferable are methyl (meth)acrylate, ethyl (meth)acrylate, n-butyl (meth)acrylate, cyclohexyl (meth)acrylate, 8-methyl-8-carboxymethyltetracyclo[4.4.0.1$^{2,5}$.1$^{7,10}$]-3-dodecene, 8-carboxymethyltetracyclo[4.4.0.1$^{2,5}$.1$^{7,10}$]-3-dodecene, 5-carboxymethylbicyclo[2.2.1]-2-heptene and the like. These olefins can be used alone or can be used in admixture of two or more to effect copolymerization.

As a copolymerizing component, dienes can be used. In particular, in the sense of a cross-linking group, non-conjugated dienes are used; however, this invention is not limited thereto. All dienes which are usually used can be used in this invention; however, it is convenient to classify the dienes into two kinds depending upon the capability of forming a branched chain on the polymer produced.

One of the two kinds is a non-conjugated diene capable of forming a branched chain on the copolymer produced, and specific examples thereof include dicyclopentadiene, 2,5-norbornadiene and aliphatic α,ω-dienes having 6 to 20 carbon atoms. The aliphatic α,ω-dienes include, for example, 1,5-hexadiene, 1,6-heptadiene, 1,7-octadiene, 1,8-nonadiene, 1,9-decadiene and the like.

The other of the two kinds is a non-conjugated diene incapable of forming a branched chain on the copolymer produced, and specific examples thereof include 5-ethylidene-2-norbornene, 1,4-hexadiene, 4-methyl-1,4-hexadiene, 5-methyl-1,4-hexadiene, 7-methyl-1,6-octadiene and the like. These non-conjugated dienes can be used alone or in admixture of two or more. However, it is preferable to use both at least one non-conjugated diene capable of forming a branched chain and at least one non-conjugated diene incapable of forming a branched chain.

It is possible to copolymerize ethylene with a polar group-containing cyclic olefin using the olefin-polymerizing catalyst of this invention.

The copolymer produced by the copolymerization is an ethylene/polar group-containing cyclic olefin copolymer having:

a) a structural unit resulting from ethylene, and
b) a structural unit resulting from the polar group-containing cyclic olefin represented by the general formula (II):

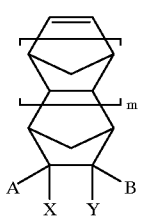

(II)

wherein A and B are the same as or different from each other and each represents a hydrogen atom or a hydrocarbon group having 1 to 10 carbon atoms; one of X and Y is an ester group represented by the formula —(CH$_2$)$_n$COOR$_1$ in which R$_1$ represents a hydrocarbon group having 1 to 20 carbon atoms and n represents an integer of 0 to 10 and the other is an ester group represented by the formula —(CH$_2$)$_n$COOR$_1$ in which R$_1$ and n are as defined above, or alternatively X and Y are bonded to each other to form a divalent group represented by the formula —(CH$_2$)$_n$CO—O—CO(CH$_2$)$_n$— in which n is as defined above; and m is 0 or 1, and having a polystyrene-reduced number average molecular weight of 1,000 to 100,000; and the proportion of the structural unit resulting from the polar group-containing cyclic olefin in the above copolymer is 1 to 99 mole % of the total of the structural units a) and b).

The structural unit resulting from the polar group-containing polycyclic olefin represented by the above-mentioned general formula (II) forms a structural unit represented by the general formula (III) in the copolymer of this invention:

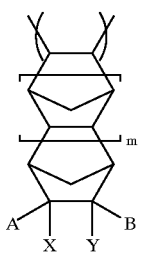

(III)

wherein A, B, X, Y and m are as defined above.

In the general formulas (II) and (III) mentioned above, A and B may be the same as or different from each other and each represents independently a hydrogen atom or a hydrocarbon group having 1 to 10 carbon atoms. Typical examples of A and B are hydrogen and straight chain alkyls such as methyl, ethyl, propyl, isopropyl, butyl, t-butyl and the like and these A and B may be the same as or different from each other.

In the general formulas (II) and (III), one of X and Y is an ester group represented by the formula —$(CH_2)_n COOR_1$ and the other is a hydrogen atom, a hydrocarbon group having 1 to 10 carbon atoms or an ester group represented by the formula —$(CH_2)_n COOR_1$. In the ester group —$(CH_2)_n COOR_1$, $R_1$ represents a hydrocarbon group having 1 to 20 carbon atoms, for example, an acyclic alkyl such as methyl, ethyl, propyl, isopropyl, butyl, t-butyl or the like and n represents an integer of 0 to 10. Also, X and Y may be bonded to each other to form a divalent group represented by the formula —$(CH_2)_n CO$—$O$—$CO(CH_2)_n$— in which n is as defined above.

In the general formulas (II) and (III), m is 0 or 1.

In general formulas (II) and (III), representatives are such that at least one of X and Y is an ester group or groups represented by the formula —$(CH_2)_n COOR_1$ in which $R_1$ is a methyl group, an ethyl group, an isobutyl group, a t-butyl group, a hexyl group, a phenyl group or a cyclohexyl group and n is 0, 1 or 2; and when one of X and Y is not said ester group, said one is a hydrogen atom or an acyclic alkyl group having 1 to 20 carbon atoms such as a methyl group, an ethyl group, a propyl group, an isopropyl group, a butyl group, a t-butyl group or the like; and m is 0 or 1.

In view of the synthesis, more representative examples are the cases where both X and Y are the above-mention ester groups or the cases where one of X and Y is the above-mentioned ester group and the other is a hydrogen atom.

Specific examples of said polar group-containing polycyclic olefin include 8-methyl-8-carboxymethyltetracyclo[4.4.0.1$^{2,5}$.1$^{7,10}$]-3-dodecene, 8-carboxymethyltetracyclo[4.4.0.1$^{2,5}$.1$^{7,10}$]-3-dodecene, 5-carboxymethylbicyclo[2.2.1]-2-heptene,

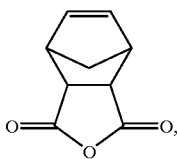

5,6-dicarboxybicyclo[2.2.1]-2-heptenoic anhydride and the like.

Other polymerizable monomers than ethylene and the polar group-containing cyclic olefin which are optionally contained in the said copolymer include specifically α-olefins having 3 or more carbon atoms such as propylene, 1-butene, 3-methyl-1-butene, 1-pentene, 4-methyl-1-pentene, 1-hexene, 1-octene, 1-decene and the like; cycloolefins such as cyclopentene, cyclohexene, 3-methylcyclohexene and the like; styrenes such as styrene, α-methylstyrene and the like; norbornenes such as norbornene, methylnorbornene, ethylnorbornene, isobutylnorbornene and the like; endomethylene type compounds such as 2,3,3a,7a-tetrahydro-4,7-methano-1H-indene, 3a,5,6,7a-tetrahydro-4,7-methano-1H-indene and the like; and non-conjugated dienes such as 1,4-hexadiene, dicyclopentadiene, 5-ethylidene-2-norbornene, 7-methyl-1,6-octadiene, 1,9-decadiene and the like. The structural units resulting from these other monomers may be contained in a proportion of not more than 50 mole % in the copolymer.

The copolymer of this invention has a polystyrene-reduced number average molecular weight ($M_n$) of 1,000 to 100,000 as measured by a gel permeation chromatography (referred to hereinafter as GPC). The molecular weight distribution represented by $M_w/M_n$ in which $M_w$ is a weight average molecular weight, is usually in the range of from 2.0 to 5.0, and only one peak is observed in the GPC. Moreover, the glass transition temperature (referred to hereinafter as $T_g$) of the copolymer is 80 to 120° C.

According to this invention, a catalyst comprising a specific transition metal compound and a specific organoaluminum compound or a catalyst comprising a specific transition metal compound, a specific organoaluminum compound and an ionic compound is useful as an olefin polymerization catalyst. Also, the transition metal compound used in the catalyst of this invention is simpler to synthesize than those in the conventional catalysts for polymerization of olefins, and enables the polymerization to proceed at a lower temperature at a lower pressure than with a catalyst system using a conventional transition metal catalyst having a nitrogen ligand, and hence, is advantageous in industry. In addition, the olefin-polymerizing catalyst of this invention is higher in copolymerizability of α-olefin than the conventional catalyst for polymerization of olefins and the olefin copolymer obtained has unique and diverse performances as compared with the convention olefin copolymers and can be expected to be put into practice in a broad industrial field.

The novel ethylene/ester group-containing cyclic olefin copolymer obtained by the polymerization with the olefin-polymerizing catalyst of this invention can be utilized in the following fields: Low molecular weight polymers (having a number average molecular weight of about 1,000 to about 5,000) can be used in fields in which a conventional synthetic wax can be utilized, namely in the fields of a paper processing material, a sizing material, a rubber antioxidant, an electric insulator, a water repellant, a lubricant for synthetic resin molding, an adhesive and the like. High molecular weight polymers having a number average molecular weight of about 5,000 to about 100,000 can be used in various optical fields in which the transparency of the polymer is utilized, in applications such as optical lens, optical fiber, optical disc, sheet, film and the like; in applications to various binders based on the polar groups possessed by the copolymer; electric and electronic fields; liquid crystal display materials; high frequency circuit substrate materials; housings of various meters; medical fields such as injection or the like; various molded articles such as general purpose sheet, film and case and the like. Moreover, When the proportion of the structural unit resulting from the ester group-containing cyclic olefin is 30% or more, the copolymer can be used in an optical field utilizing its transparency and when the proportion is less than 30 mole %, the copolymer can be utilized as an improver for adhesiveness to a metal or other materials.

DESCRIPTION OF THE PREFERRED EMBODIMENTS

Modes for carrying out this invention are explained below in more detail by Examples. However, this invention should not be construed to be limited to only the Examples. In the following Examples and Comparative Examples, % means % by weight unless otherwise specified.

In the Examples and Comparative Examples, the physical properties were measured as follows.
(A) α-Olefin content (% by weight)
    Determined by $^1$H-NMR.
(B) Iodine value
    Determined by an iodine titration method.
(C) Number average molecular weight ($M_n$) and molecular weight distribution ($M_w/M_n$)
    Measured at 120° C. in o-dichlorobenzene as a solvent using a gel permeation chromatography apparatus (Model 150C manufactured by WATERS), provided that the ester group-containing polymers in Examples 25 to 32 was dissolved in tetrahydrofuran (THF) and the measurement was effected at 30° C. Incidentally, the number average molecular weight ($M_n$) and the weight average molecular weight ($M_w$) are both polystyrene-reduced values.
(D) Ester group-containing olefin content (% by weight)
    Determined by $^1$H-NMR.
(E) Glass transition temperature ($T_g$)
    Measured using a differential scanning calorimeter (DSC) manufactured by SII (SSC5200H) at a temperature ranging from 50° C. to 300° C. at a temperature elevating rate of 10° C./min in a nitrogen atmosphere.

[Synthesis of Transition Metal Compound (A)]

EXAMPLE 1

Synthesis of 1,4,7-triazacyclononanyltitanium chloride

In a mixed solution of 30 milliliters of well dried diethyl ether with 20 milliliters of well dried methylene chloride was dissolved 0.5 g (3.87 millimoles) of 1,4,7-triazacyclononane, and to the resulting solution was dropwise added a toluene solution of 0.794 g (12.4 millimoles) of n-butyllithium at −50° C. over 1 hour, after they were mixed and then subjected to reaction for 1 hour at −20° C. Thereafter, the lithium salt precipitate produced by the reaction was separated by filtration and then washed with well dried hexane in the presence of an inert gas and thereafter dried at room temperature, after which this lithium salt was mixed with 70 milliliters of well dried toluene.

Separately, 0.734 g (3.87 millimoles) of titanium tetrachloride was dissolved in 20 milliliters of diethyl ether at −5° C. This solution was dropwise added at −60° C. over 2 hours to the toluene mixed solution prepared previously, and the resulting mixture was thereafter heated to 40° C. and then subjected to reaction for 6 hours. Subsequently, the reaction mixture obtained was subjected to recrystallization from a hexane/methylene chloride mixed solvent to isolate the product, thereby obtaining 1,4,7-triazacyclononanyltitanium chloride in a yield of 46%.

EXAMPLE 2

Synthesis of 1,5,9-triazacyclododecanyltitanium chloride

In a mixed solution of 30 milliliters of well dried diethyl ether and 20 milliliters of well dried methylene chloride was dissolved 0.5 g (2.92 millimoles) of 1,5,9-triazacyclododecane, and to this solution was dropwise added a toluene solution of 0.599 g (9.35 millimoles) of n-butyllithium at −50° C. over 1 hour and they were mixed and then subjected to reaction at −20° C. for 1 hour. Thereafter, the lithium salt precipitate produced by the reaction was separated by filtration and then washed with well dried hexane in the presence of an inert gas and thereafter dried at room temperature, after which this lithium salt was mixed with 70 milliliters of well dried toluene.

Separately, 0.554 g (2.92 millimoles) of titanium tetrachloride was dissolved in 20 milliliters of diethyl ether at −5° C. This solution was dropwise added at −60° C. over 2 hours to the toluene mixed solution prepared previously. The resulting mixture was thereafter heated to 40° C. and then subjected to reaction for a further 6 hours. Subsequently, the reaction mixture obtained was subjected to recrystallization from a hexane/methylene chloride mixed solvent to isolate the product, thereby obtaining 1,5,9-triazacyclododecanyltitanium chloride in a yield of 44%.

EXAMPLE 3

Synthesis of (2,6,10-tritrifluoromethyl)-1,5,9-triazacyclododecanyltitanium chloride In a mixed solution of 30 milliliters of well dried diethyl ether and 20 milliliters of well dried methylene chloride was dissolved 0.8 g (2.13 millimoles) of (2,6,10-tritrifluoromethyl)-1,5,9-triazacyclododecane, and to this solution was dropwise added at −50° C. over 1 hour a toluene solution of 0.437 g (6.82 millimoles) of n-butyllithium, and they were mixed and then subjected to reaction at −20° C. for 1 hour. Subsequently, the lithium salt precipitate produced by the reaction was separated by filtration, washed with well dried hexane in the presence of an inert gas and then dried at room temperature, after which this lithium salt was mixed with 70 milliliters of well dried toluene.

Separately, 0.404 g (2.13 millimoles) of titanium tetrachloride was dissolved in 20 milliliters of diethyl ether at −50° C. The resulting solution was dropwise added at −60° C. over 2 hours to the toluene mixed solution prepared previously, and the resulting mixture was then heated to 40° C. and thereafter subjected to reaction for a further 6 hours. Subsequently, the reaction mixture obtained was subjected to recrystallization from a hexane/methylene chloride mixed solvent to isolate the product, thereby obtaining 1,5,9-triazacyclododecanyltitanium chloride in a yield of 31%.

EXAMPLE 4

Synthesis of N-phenyl-1,4,7-triazacyclononanyltitanium dichloride

In a mixed solution of 30 milliliters of well dried diethyl ether and 20 milliliters of well dried methylene chloride was dissolved 0.7 g (3.41 millimoles) of N-phenyl-1,4,7-triazacyclononane, and to this solution was dropwise added at −50° C. over 1 hour a toluene solution of 0.698 g (10.9 millimoles) of n-butyllithium, and they were mixed and then subjected to reaction at −20° C. for 1 hour. Subsequently, the lithium salt precipitate produced by the reaction was separated by filtration, washed with well dried hexane in the presence of an inert gas and then dried at room temperature, after which this lithium salt was mixed with 70 milliliters of well dried toluene.

Separately, 0.647 g (3.41 millimoles) of titanium tetrachloride was dissolved in 20 milliliters of diethyl ether at −50° C. The resulting solution was dropwise added at −60° C. over 2 hours to the toluene mixed solution prepared previously, and the resulting mixture was then heated to 40° C. and then subjected to reaction for a further 6 hours. Subsequently, the reaction mixture obtained was subjected to recrystallization from a hexane/methylene chloride mixed solvent to isolate the product, thereby obtaining N-phenyl-1,4,7-triazacyclononanyltitanium chloride in a yield of 35%.

[Synthesis of Ethylene/α-olefin Copolymer]

EXAMPLE 5

In a 3-liter stainless steel autoclave which had been thoroughly purged with nitrogen were placed 1.9 liters of purified toluene, 0.1 liter of 1-hexene and methyl aluminoxane in an amount of 6 millimoles in terms of aluminum atom dissolved in 4 milliliters of purified toluene, and the temperature was elevated to 30° C., after which the autoclave was pressurized with ethylene to adjust the ethylene partial pressure to 1 kg/cm$^2$.

Subsequently, 1.2 μmoles of 1,5,9-triazacyclododecanyltitanium chloride dissolved in 1.2 milliliters of purified toluene was placed in the autoclave to start polymerization. The temperature was kept at 30° C. during the reaction and the reaction was effected for 10 minutes while ethylene was continuously fed so as to keep the ethylene partial pressure at 1 kg/cm$^2$. After completion of the reaction, the polymer solution was introduced into 2 liters of methanol to precipitate a polymer, and this polymer was separated by filtration and dried under reduced pressure to obtain 1.25 g of the polymer.

This polymer was an ethylene/1-hexene copolymer having a 1-hexene content of 56%, a number average molecular weight ($M_n$) of 120,000 and a molecular weight distribution ($M_w/M_n$) of 2.50.

EXAMPLE 6

In a 3-liter stainless steel autoclave which had been thoroughly purged with nitrogen were placed 1.9 liters of purified toluene, 0.1 liter of 1-hexene and 0.6 millimoles of triisobutylaluminum dissolved in 4 milliliters of purified toluene, and further 1.5 μmoles of dimethylanilinium tetrakis(pentafluorophenyl)borate was placed therein, after which the temperature was elevated to 30° C. Thereafter, the autoclave was pressurized with ethylene to adjust the ethylene partial pressure to 1 kg/cm$^2$.

Subsequently, 1.2 μmoles of 1,5,9-triazacyclododecanyltitanium chloride dissolved in 1.2 milliliters of purified toluene was placed in the autoclave to start polymerization. The temperature was kept at 30° C. during the reaction and the reaction was effected for 10 minutes while ethylene was continuously fed so as to keep the ethylene partial pressure at 1 kg/cm$^2$. After completion of the reaction, the polymer solution was introduced into 2 liters of methanol to precipitate a polymer, and this polymer was separated by filtration and dried under reduced pressure to obtain 5.0 g of the polymer.

This polymer was an ethylene/1-hexene copolymer having a 1-hexene content of 57%, a number average molecular weight ($M_n$) of 135,000 and a molecular weight distribution ($M_w/M_n$) of 2.24.

EXAMPLE 7

The same procedure as in Example 5 was repeated, except that 1,4,7-triazacyclononanyltitanium chloride was substituted for the 1,5,9-triazacyclododecanyltitanium chloride, to obtain 1.98 g of a polymer.

This polymer was an ethylene/1-hexene copolymer having a 1-hexene content of 50%, a number average molecular weight ($M_n$) of 122,000 and a molecular weight distribution ($M_w/M_n$) of 2.75.

EXAMPLE 8

The same procedure as in Example 6 was repeated, except that 1,4,7-triazacyclononanyltitanium chloride was substituted for the 1,5,9-triazacyclododecanyltitanium chloride, to obtain 2.51 g of a polymer.

This polymer was an ethylene/1-hexene copolymer having a 1-hexene content of 52%, a number average molecular weight ($M_n$) of 15,300 and a molecular weight distribution ($M_w/M_n$) of 3.02.

EXAMPLE 9

The same procedure as in Example 5 was repeated, except that 1-octene was subjected for the 1-hexene, to obtain 1.35 g of a polymer.

This polymer was an ethylene/1-octene copolymer having a 1-octene content of 78%, a number average molecular weight ($M_n$) of 14,500 and a molecular weight distribution ($M_w/M_n$) of 2.46.

EXAMPLE 10

The same procedure as in Example 6 was repeated, except that 1-octene was substituted for the 1-hexene, to obtain 5.80 g of a polymer.

This polymer was an ethylene/1-octene copolymer having a 1-octene content of 76%, a number average molecular weight ($M_n$) of 16,600 and a molecular weight distribution ($M_w/M_n$) of 2.55.

EXAMPLE 11

The same procedure as in Example 5 was repeated, except that 1-octene was substituted for the 1-hexene and the ethylene partial pressure was changed to 4 kg/cm$^2$, to obtain 8.4 g of a polymer.

This polymer was an ethylene/1-octene copolymer having a 1-octene content of 68%, a number average molecular weight ($M_n$) of 16,800 and a molecular weight distribution ($M_w/M_n$) of 2.66.

EXAMPLE 12

The same procedure as in Example 6 was repeated, except that 1-octene was substituted for the 1-hexene and the ethylene partial pressure was changed to 4 kg/cm$^2$, to obtain 8.12 g of a polymer.

This polymer was an ethylene/1-octene copolymer having a 1-octene content of 71%, a number average molecular weight ($M_n$) of 18,500 and a molecular weight distribution ($M_w/M_n$) of 2.71.

[Synthesis of Propylene/α-olefin Copolymer]

EXAMPLE 13

The same procedure as in Example 5 was repeated, except that 1-octene was substituted for the 1-hexene, propylene was substituted for the ethylene, and the propylene partial pressure was adjusted to 3 kg/cm$^2$, to obtain 2.45 g of a polymer.

This polymer was a propylene/1-octene copolymer having a 1-octene content of 57%, a number average molecular weight ($M_n$) of 134,200 and a molecular weight distribution ($M_w/M_n$) of 3.02.

EXAMPLE 14

The same procedure as in Example 6 was repeated, except that 1-octene was substituted for the 1-hexene, propylene was substituted for the ethylene and the propylene partial pressure was adjusted to 3 kg/cm², to obtain 2.39 g of a polymer.

This polymer was a propylene/1-octene copolymer having a 1-octene content of 63%, a number average molecular weight ($M_n$) of 127,000 and a molecular weight distribution ($M_w/M_n$) of 2.95.

[Synthesis of Copolymer of α-olefins with Each Other]

EXAMPLE 15

The same procedure as in Example 5 was repeated, except that in addition to the 1-hexene, 0.1 milliliter of 1-octene was added and the pressurizing with ethylene was not effected, to obtain 2.4 g of a polymer.

This polymer was a 1-hexene/1-octene copolymer having a number average molecular weight ($M_n$) of 98,800 and a molecular weight distribution ($M_w/M_n$) of 3.26.

EXAMPLE 16

The same procedure as in Example 6 was repeated, except that in addition to the 1-hexene, 0.1 milliliter of 1-octene was added and the pressurizing with ethylene was not effected, to obtain 2.4 g of a polymer.

This polymer was a 1-hexene-1-octene copolymer having a number average molecular weight ($M_n$) of 88,800 and a molecular weight distribution ($M_w/M_n$) of 3.01.

[Synthesis of Ethylene/α-olefin/diene Copolymer]

EXAMPLE 17

In a 2-liter stainless steel autoclave which had been thoroughly purged with nitrogen were placed 800 milliliters of purified toluene, 200 milliliters of 1-hexene, 5 milliliters of dicyclopentadiene, 7 milliliters of 5-ethylidene-2-norbornene and methyl aluminoxane in an amount of 6 millimoles in terms of aluminum atom dissolved in 4 milliliters of purified toluene, and thereafter, the temperature was elevated to 40° C., after which the autoclave was pressurized with ethylene to adjust the ethylene partial pressure to 4 kg/cm².

Subsequently, 1.2 μmoles of 1,5,9-triazacyclododecanyltitanium chloride dissolved in 1.2 milliliters of purified toluene was placed in the autoclave to start polymerization. The temperature was kept at 40° C. during the reaction and the reaction was effected for 20 minutes while ethylene was continuously fed so as to keep the ethylene partial pressure at 4 kg/cm². After completion of the reaction, the polymer solution was introduced into 2 liters of methanol to precipitate a polymer, and this polymer was separated by filtration and dried under reduced pressure to obtain 5.9 of the polymer.

This polymer was an ethylene/1-hexene/dicyclopentadiene/5-ethylidene-2-norbornene random copolymer having a 1-hexene content of 14.8%, an iodine value of 14, a number average molecular weight ($M_n$) of 92,000 and a molecular weight distribution ($M_w/M_n$) of 4.8.

EXAMPLE 18

The same procedure as in Example 17 was repeated, except that 1-octene was substituted for the 1-hexene, to obtain 6.3 g of a polymer.

This polymer was an ethylene/1-octene/dicyclopentadiene/5-ethylidene-2-norbornene random copolymer having a 1-octene content of 27.3%, an iodine value of 23, a number average molecular weight ($M_n$) of 89,000 and a molecular weight distribution of 5.0.

EXAMPLE 19

The same procedure as in Example 17 was repeated, except that 1-octene was substituted for the 1-hexene, propylene was substituted for the ethylene and the propylene partial pressure was adjusted to 3 kg/cm², to obtain 5.5 g of a polymer.

This polymer was a propylene/1-octene/dicyclopentadiene/5-ethylidene-2-norbornene random copolymer having a 1-octene content of 27.3%, an iodine value of 19, a number average molecular weight ($M_n$) of 79,000 and a molecular weight distribution ($M_w/M_n$) of 4.0.

[Polymerization with Other Catalysts]

Comparative Example 1

In a 3-liter stainless steel autoclave which had been thoroughly purged with nitrogen were placed 1.9 liters of purified toluene, 0.1 liter of 1-hexene and methyl aluminoxane in an amount of 6 millimoles in terms of aluminum atom dissolved in 4 milliliters of purified toluene, and the temperature was elevated to 30° C., after which the autoclave was pressurized with ethylene to adjust the ethylene partial pressure to 1 kg/cm².

Subsequently, 1.2 μmoles of ethylenebis(indenyl)zirconium dichloride dissolved in 1.2 milliliters of purified toluene was placed in the autoclave to start polymerization. The temperature was kept at 30° C. during the reaction and the reaction was effected for 10 minutes while ethylene was continuously fed so as to keep the ethylene partial pressure at 1 kg/cm². After completion of the reaction, the polymer solution was introduced into 2 liters of methanol to precipitate a polymer, and this polymer was separated by filtration and dried under reduced pressure to obtain 1.25 g of the polymer.

This polymer was an ethylene/1-hexene copolymer having a 1-hexene content of 28%, a number average molecular weight ($M_n$) of 230,000 and a molecular weight distribution ($M_w/M_n$) of 2.35, and the above 1-hexene content was remarkably low as compared with that of the copolymer obtained in Example 5.

Comparative Example 2

The same procedure as in Comparative Example 1 was repeated, except that tetrakis(dioctylamino)zirconium was substituted for the ethylenebis(indenyl)zirconium dichloride, to obtain 1.67 g of a polymer.

This polymer was an ethylene/1-hexene copolymer having a 1-hexene content of 38%, a number average molecular weight ($M_n$) of 87,000 and a molecular weight distribution ($M_w/M_n$) of 4.35, and the above 1-hexene content was remarkably low as compared with that of the copolymer obtained in Example 5.

Comparative Example 3

The same procedure as in Comparative Example 1 was repeated, except that (F6-acen) di-tert-butyl zirconium is substituted for the ethylenebis(indenyl)zirconium dichloride, to obtain 0.89 g of a polymer.

This polymer was an ethylene/1-hexene copolymer having a 1-hexene content of 5%, a number average molecular weight (Mn) of 12,000 and a molecular weight distribution (Mw/Mn) of 2.98, and the above 1-hexene content was remarkably low as compared with that of the copolymer obtained in Example 5.

[Polymerization of Ethylene with Polar Olefin]

EXAMPLE 20

In a 3-liter stainless steel autoclave which had been thoroughly purged with nitrogen were placed 1.9 liters of purified toluene, 0.1 liter of methyl methacrylate and methyl aluminoxane in an amount of 6 millimoles in terms of aluminum atom dissolved in 4 milliliters of purified toluene, and the temperature was elevated to 30° C., after which the autoclave was pressurized with ethylene to adjust the ethylene partial pressure to 1 kg/cm$^2$.

Subsequently, 1.2 µmoles of 1,5,9-triazacyclododecanyltitanium chloride dissolved in 1.2 milliliters of purified toluene was placed in the autoclave to start polymerization. The temperature was kept at 50° C. during the reaction and the reaction was effected for 60 minutes while ethylene was continuously fed so as to keep the ethylene partial pressure at 1 kg/cm$^2$. After completion of the reaction, the polymer solution was introduced into 2 liters of methanol to precipitate a polymer, and this polymer was separated by filtration and dried under reduced pressure to obtain 0.87 g of the polymer.

This polymer was a copolymer of ethylene with methyl methacrylate having a methyl methacrylate content of 82%, a number average molecular weight ($M_n$) of 8,800 and a molecular weight distribution ($M_w/M_n$) of 2.87.

EXAMPLE 21

The same procedure as in Example 20 was repeated, except that 1,4,7-triazacyclononanyltitanium chloride was substituted for the 1,5,9-triazacyclododecanyltitanium chloride, to obtain 0.56 g of a polymer.

This polymer was a copolymer of ethylene with methyl methacrylate having a methyl methacrylate content of 78%, a number average molecular weight ($M_n$) of 9,000 and a molecular weight distribution ($M_w/M_n$) of 3.07.

EXAMPLE 22

In a 3-liter stainless steel autoclave which had been thoroughly purged with nitrogen were placed 1.9 liters of purified toluene, 0.1 liter of methyl methacrylate and 0.6 millimoles of triisobutylaluminum dissolved in 4 milliliters of purified toluene, and further 1.5 µmoles of dimethylanilinium tetrakis(pentafluorophenyl)borate was placed therein, after which the temperature was elevated to 30° C. Thereafter, the autoclave was pressurized with ethylene to adjust the ethylene partial pressure to 1 kg/cm$^2$.

Subsequently, 1.2 µmoles of 1,5,9-triazacyclododecanyltitanium chloride dissolved in 1.2 milliliters of purified toluene was placed in the autoclave to start polymerization. The temperature was kept at 50° C. during the reaction and the reaction was effected for 60 minutes while ethylene was continuously fed so as to keep the ethylene partial pressure at 1 kg/cm$^2$. After completion of the reaction, the polymer solution was introduced into 2 liters of methanol to precipitate a polymer, and this polymer was separated by filtration and dried under reduced pressure to obtain 0.43 g of the polymer.

This polymer was a copolymer of ethylene with methyl methacrylate having a methyl methacrylate content of 88%, a number average molecular weight ($M_n$) of 88,000 and a molecular weight distribution ($M_w/M_n$) of 3.15.

EXAMPLE 23

The same procedure as in Example 22 was repeated, except that 1,4,7-triazacyclononanyltitanium chloride was substituted for the 1,5,9-triazacyclododecanyltitanium chloride, to obtain 0.34 g of a polymer.

This polymer was a copolymer of ethylene with methyl methacrylate having a methyl methacrylate content of 92%, a number average molecular weight ($M_n$) of 7,900 and a molecular weight distribution ($M_w/M_n$) of 3.11.

EXAMPLE 24

The same procedure as in Example 20 was repeated, except that methyl acrylate was substituted for the methyl methacrylate, to obtain 0.91 g of a polymer.

This polymer was a copolymer of ethylene with methyl acrylate having a methyl acrylate content of 85%, a number average molecular weight ($M_n$) of 9,900 and a molecular weight distribution ($M_w/M_n$) of 2.90.

[Homopolymerization of Polar Olefin]

EXAMPLE 25

In a 3-liter stainless steel autoclave which had been thoroughly purged with nitrogen were placed 1.9 liters of purified toluene, 0.1 liter of methyl methacrylate and methyl aluminoxane in an amount of 6 millimoles in terms of aluminum atom dissolved in 4 milliliters of purified toluene, and the temperature was elevated to 30° C.

Subsequently, 1.2 µmoles of 1,5,9-triazacyclododecanyltitanium chloride dissolved in 1.2 milliliters of purified toluene was placed in the autoclave to start polymerization. The temperature was kept at 50° C. during the reaction and the reaction was effected for 60 minutes. After completion of the reaction, the polymer solution was introduced into 2 liters of methanol to precipitate a polymer, and this polymer was separated by filtration and dried under reduced pressure to obtain 3.59 g of the polymer.

This polymer was a methyl methacrylate polymer having a number average molecular weight ($M_n$) of 12,800 and a molecular weight distribution ($M_w/M_n$) of 2.56.

EXAMPLE 26

The same procedure as in Example 25 was repeated, except that methyl acrylate was substituted for the methyl methacrylate, to obtain 2.03 g of a polymer.

This polymer was a methyl acrylate polymer having a number average molecular weight ($M_n$) of 11,900 and a molecular weight distribution ($M_w/M_n$) of 2.60.

[Copolymerization of Ethylene with Ester Group-containing Cyclic Olefin]

EXAMPLE 27

In a 3-liter stainless steel autoclave which had been thoroughly purged with nitrogen were placed 1.9 liters of purified toluene, 0.1 liter of 8-methyl-8-carboxymethyltetracyclo[4.4.0.1$^{2,5}$.1$^{7,10}$]-3-dodecene and methyl aluminoxane in an amount of 6 millimoles in terms of aluminum atom dissolved in 4 milliliters of purified toluene, and the temperature was elevated to 30° C., after which the autoclave was pressurized with ethylene to adjust the ethylene partial pressure to 1 kg/cm$^2$.

Subsequently, 1.2 µmoles of 1,5,9-triazacyclododecanyltitanium chloride dissolved in 1.2 milliliters of purified toluene was placed in the autoclave to start polymerization. The temperature was kept at 30° C. during the reaction and the reaction was effected for one hour while ethylene was continuously fed so as to keep the ethylene partial pressure at 1 kg/cm². After completion of the reaction, the polymer solution was introduced into 2 liters of methanol to precipitate a polymer, and this polymer was separated by filtration and dried under reduced pressure to obtain 1.25 g of the polymer.

This polymer was an ethylene/8-methyl-8-carboxymethyltetracyclo[4.4.0.1$^{2,5}$.1$^{7,10}$]-3-dodecene copolymer having a content of the cyclic olefin fed of 89 mole %, a number average molecular weight ($M_n$) of 9,800 and a molecular weight distribution ($M_w/M_n$) of 2.87. The $T_g$ of this copolymer was 121° C.

The $^1$H-NMR chart of the copolymer obtained is shown in FIG. 1.

EXAMPLE 28

In a 3-liter stainless steel autoclave which had been thoroughly purged with nitrogen were placed 1.9 liters of purified toluene, 0.1 liter of 8-methyl-8-carboxymethyltetracyclo[4.4.0.1$^{2,5}$.1$^{7,10}$]-3-dodecene and 0.6 millimoles of triisobutylaluminum dissolved in 4 milliliters of purified toluene, and further 1.5 μmoles of dimethylanilinium tetrakis(pentafluorophenyl)borate was placed therein, after which the temperature was elevated to 30° C. Thereafter, the autoclave was pressurized with ethylene to adjust the ethylene partial pressure to 1 kg/cm².

Subsequently, 1.2 μmoles of 1,5,9-triazacyclododecanyltitanium chloride dissolved in 1.2 milliliters of purified toluene was placed in the autoclave to start polymerization. The temperature was kept at 30° C. during the reaction and the reaction was effected for 1 hour while ethylene was continuously fed so as to keep the ethylene partial pressure at 1 kg/cm². After completion of the reaction, the polymer solution was introduced into 2 liters of methanol to precipitate a polymer, and this polymer was separated by filtration and dried under reduced pressure to obtain 2.36 g of the polymer.

This polymer was an ethylene/8-methyl-8-carboxymethyltetracyclo[4.4.0.1$^{2,5}$.1$^{7,10}$]-3-dodecene copolymer having a content of the cyclic olefin fed of 82 mole %, a number average molecular weight ($M_n$) of 12,200 and a molecular weight distribution ($M_w/M_n$) of 2.80. The $T_g$ of this copolymer was 102° C.

EXAMPLE 29

The same procedure as in Example 27 was repeated, except that 5-carboxymethylbicyclo[2.2.1]-2-heptene was substituted for the 8-methyl-8-carboxymethyltetracyclo[4.4.0.1$^{2,5}$.1$^{7,10}$]-3-dodecene as the polar group-containing cyclic olefin, to obtain 0.78 g of a polymer.

This polymer was an ethylene/5-carboxymethylbicyclo[2.2.1]-2-heptene copolymer having a content of the cyclic olefin fed of 95 mole %, a number average molecular weight ($M_n$) of 9,700 and a molecular weight distribution ($M_w/M_n$) of 3.01. The Tg of this copolymer was 104° C.

EXAMPLE 30

The same procedure as in Example 28 was repeated, except that 5-carboxymethylbicyclo[2.2.1]-2-heptene was substituted for the 8-methyl-8-carboxymethyltetracyclo[4.4.0.1$^{2,5}$.1$^{7,10}$]-3-dodecene as the polar group-containing cyclic olefin, to obtain 1.55 g of a polymer.

This polymer was an ethylene/5-carboxymethylbicyclo[2.2.1]-2-heptene copolymer having a content of the cyclic olefin fed of 90 mole %, a number average molecular weight ($M_n$) of 10,800 and a molecular weight distribution ($M_w/M_n$) of 2.99. The Tg of this copolymer was 107° C.

EXAMPLE 31

The same procedure as in Example 27 was repeated, except that 1,4,7-triazacyclononanyltitanium chloride was substituted for the 1,5,9-triazacyclododecanyltitanium chloride, to obtain 0.59 g of a polymer.

This polymer was an ethylene/8-methyl-8-carboxymethyltetracyclo[4.4.0.1$^{2,5}$.1$^{7,10}$]-3-dodecene copolymer having a content of the cyclic olefin fed of 88 mole %, a number average molecular weight ($M_n$) of 10,200 and a molecular weight distribution of 3.05. The Tg of this copolymer was 107° C.

EXAMPLE 32

The same procedure as in Example 28 was repeated, except that 1,4,7-triazacyclononanyltitanium chloride was substituted for the 1,5,9-triazacyclododecanyltitanium chloride, to obtain 1.82 g of a polymer.

This polymer was an ethylene/8-methyl-8-carboxymethyltetracyclo[4.4.0.1$^{2,5}$.1$^{7,10}$]-3-dodecene copolymer having a content of the cyclic olefin fed of 93 mole %, a number average molecular weight ($M_n$) of 9,200 and a molecular weight distribution ($M_w/M_n$) of 3.11. The Tg of this copolymer was 112° C.

What is claimed is:

1. An ethylene/polar group-containing cyclic olefin copolymer consisting of:
    a) a structural unit resulting from ethylene and
    b) a structural unit resulting from a polar group-containing cyclic olefin represented by the general formula (II):

(II)

wherein A and B may be the same as or different from each other and each represents independently a hydrogen atom or a hydrocarbon group having 1 to 10 carbon atoms; one of X and Y represents an ester group represented by the formula —(CH$_2$)$_n$COOR$_1$ in which R$_1$ is a hydrocarbon group having 1 to 20 carbon atoms and n represents an integer of 0 to 10, and the other represents a hydrogen atom, a hydrocarbon group having 1 to 10 carbon atoms or an ester group represented by the formula —(CH$_2$)$_n$COOR$_1$ in which R$_1$ and n are as defined above, or alternatively X and Y are bonded to each other to form a divalent group represented by the formula —(CH$_2$)$_n$CO—O—CO(CH$_2$)$_n$— in which n is as defined above; and m is 0 or 1; and having polystyrene-reduced number average molecular weight of 1,000 to 100,000, the proportion of the structural unit resulting from the polar group-containing cyclic olefin in the copolymer being 1 to 99 mole %, wherein said copolymer is obtained by copolymerizing ethylene with said polar group-containing cyclic olefin represented by said general formula (II), in the presence of a catalyst which comprises
(A) a transition metal compound consisting of a center transition metal and a cyclic ligand having in its main chain skeleton at least two N atoms bonded to one another through a saturated carbon chain, at least one of which N atoms bonds to the center transition metal; and at least one member selected from the group consisting of the following compounds (B) and (C):
(B) at least one compound selected from an organoaluminum compound represented by the general formula (1) and an aluminoxane compound:

$$R_aAlZ_{3-a} \quad (1)$$

wherein R is a hydrocarbon group, having 1 to 20 carbon atoms, Z is a hydrogen atom, an alkoxy group or a halogen atom and $0 < a \leq 3$, and
(C) an ionic compound, wherein said ionic compound has both at least one anion and at least one cation and is present as an ion in a solvent or medium in which said copolymerizing is conducted.

2. The copolymer according to claim 1, wherein said ionic compound (C) is represented by the general formula (i):

$$([L]^{k+})_p([M'A^1A^2 \ldots A^n]^-)_q \quad (i)$$

wherein $[L]^{k+}$ is a Brønsted acid or a Lewis acid; M' is an element of Groups 13 to 15 of the Periodic Table; each of $A^1$, $A^2$, ... $A^n$ is independently a hydrogen atom, a halogen atom, an alkyl group having 1 to 20 carbon atoms, a dialkylamino group having 1 to 30 carbon atoms, an alkoxy group having 1 to 20 carbon atoms, an aryl group having 6 to 40 carbon atoms, an aryloxy group having 6 to 40 carbon atoms, an alkaryl group having 7 to 40 carbon atoms, an aralkyl group having 7 to 40 carbon atoms, a halogen-substituted hydrocarbon group having 1 to 40 carbon atoms, an acyloxy group having 1 to 20 carbon atoms or an organic metalloid group; k is the ionic valence of L and is an integer of 1 to 3; p is an integer of not less than 1; and $q = (k \times p)$.

3. The copolymer according to claim 1, wherein said ionic compound (C) is selected from the group consisting of trimethylammonium tetraphenylborate, triethylammonium tetraphenylborate, tributylammonium tetraphenylborate, methyl(dibutyl)ammonium tetraphenylborate, dimethylanilinium tetraphenylborate, methylpyridinium tetraphenylborate, methyl(2-cyanopyridinium) tetraphenylborate, methyl(4-cyanopyridinium) tetraphenylborate, trimethylammonium tetrakis(pentafluorophenyl)borate, triethylammonium tetrakis(pentafluorophenyl)borate, tributylammonium tetrakis(pentafluorophenyl)borate, methyl(dibutyl)ammonium tetrakis(pentafluorophenyl)borate, dimethylanilinium tetrakis(pentafluorophenyl)borate, methylpyridinium tetrakis(pentafluorophenyl)borate, methyl(2-cyanopyridinium) tetrakis(pentafluorophenyl)borate, methyl(4-cyanopyridinium) tetrakis(pentafluorophenyl)borate, dimethylanilinium tetrakis[bis(3,5-ditrifluoromethyl)phenyl]borate, ferrocenium tetraphenylborate, silver tetraphenylborate, and ferrocenium tetrakis(pentafluorophenyl)borate.

4. The copolymer according to claim 1, wherein the catalyst comprises the compounds (A) and (B) or compounds (A), (B) and (C).

5. The copolymer according to claim 1, wherein the number of the N atoms in the transition metal compound (A) is an integer of 2 to 4.

6. The copolymer according to claim 1, wherein the center transition metal in the transition metal compound (A) is a metal of Groups 3 to 5 or the lanthanum series of the Periodic Table.

7. The copolymer according to claim 1, wherein all the N-atoms in the transition metal compound (A) are bonded to the center transition metal.

8. The copolymer according to claim 1, wherein the structure of the transition metal compound (A) is represented by the general formula (b):

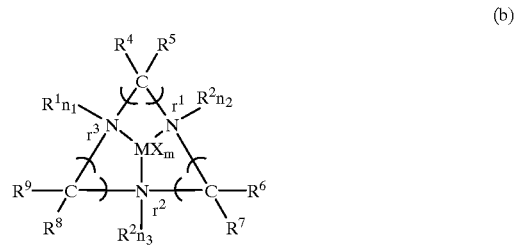

(b)

wherein $r^1$ to $r^3$ are integers of 1 to 20 and may be the same as or different from one another; $n_1$ to $n_3$ are 0 or 1; $R^1$ to $R^9$ may be the same as or different from one another and each represents independently a hydrogen atom, a hydrocarbon group having 1 to 20 carbon atoms, an alkoxy group having 1 to 20 carbon atoms, a carboxyl group, an ester group having 2 to 20 carbon atoms, a halogen atom, a halogenated hydrocarbon group having 1 to 20 carbon atoms or an alkylsilyl group having 1 to 20 carbon atoms; M is a metal of Groups 3 to 5 or the lanthanum series of the Periodic Table; X is a σ-bonding ligand or a chelate ligand; m is an integer of 0 to 3 satisfying the equation [(number of N's bonded to M)+m=oxidation number of M].

9. The copolymer according to claim 8, wherein the center transition metal M is Ti, Zr or Hf.

10. A process for producing an ethylene/polar group-containing cyclic olefin copolymer consisting of:
a) a structural unit resulting from ethylene and
b) a structural unit resulting from a polar group-containing cyclic olefin represented by the general formula (II):

(II)

wherein A and B may be the same as or different from each other and each represents independently a hydrogen atom or a hydrocarbon group having 1 to 10 carbon atoms; one of X and Y represents an ester group represented by the formula $-(CH_2)_nCOOR_1$ in which $R_1$ is a hydrocarbon group having 1 to 20 carbon atoms and n represents an integer of 0 to 10, and the other represents a hydrogen atom, a hydrocarbon group having 1 to 10 carbon atoms or an ester group represented by the formula $-(CH_2)_nCOOR_1$ in which $R_1$ and n are as defined above, or alternatively X and Y are bonded to each other to form a divalent group represented by the formula —(CH$_2$)$_n$CO—O—CO(C$_2$)$_n$— in which n is as defined above; and m is 0 or 1; and having polystyrene-reduced number average molecular weight of 1,000 to 100,000, the proportion of the structural unit resulting from the polar group-containing cyclic olefin in the copolymer being 1 to 99 mole %, said process comprising copolymerizing ethylene with said polar group-containing cyclic olefin represented by said general formula (II), in the presence of a catalyst which comprises (A) a transition metal compound consisting of a center transition metal and a cyclic ligand having in its main chain skeleton at least two N atoms bonded to one another through a saturated carbon chain, at least one of which N atoms bonds to the center transition metal; and at least one member selected from the group consisting of the following compounds (B) and (C):

(B) at least one compound selected from an organoaluminum compound represented by the general formula (1) and an aluminoxane compound:

$$R_a AlZ_{3-a} \qquad (1)$$

wherein R is a hydrocarbon group, having 1 to 20 carbon atoms, Z is a hydrogen atom, an alkoxy group or a halogen atom and 0<a≦3, and (C) an ionic compound, wherein said ionic compound has both at least one anion and at least one cation and is present as an ion in a solvent or medium in which said copolymerizing is conducted.

* * * * *